US012647473B2

(12) United States Patent
Yang

(10) Patent No.: US 12,647,473 B2
(45) Date of Patent: Jun. 2, 2026

(54) METHOD AND APPARATUS FOR PROVIDING MEDIA-BASED QoS FOR REAL-TIME COMMUNICATION SERVICE IN MOBILE COMMUNICATION SYSTEMS

(71) Applicant: Samsung Electronics Co., Ltd., Suwon-si (KR)

(72) Inventor: Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 18/447,574

(22) Filed: Aug. 10, 2023

(65) Prior Publication Data

US 2024/0064190 A1 Feb. 22, 2024

(30) Foreign Application Priority Data

Aug. 19, 2022 (KR) ......................... 10-2022-0104152
Dec. 22, 2022 (KR) ......................... 10-2022-0181767

(51) Int. Cl.
| | |
|---|---|
| *G06F 13/00* | (2006.01) |
| *H04L 65/65* | (2022.01) |
| *H04L 65/80* | (2022.01) |
| *H04W 28/02* | (2009.01) |

(52) U.S. Cl.
CPC .............. *H04L 65/80* (2013.01); *H04L 65/65* (2022.05); *H04W 28/0268* (2013.01)

(58) Field of Classification Search
CPC ..... H04L 65/80; H04L 65/65; H04L 65/1069; H04W 28/0268

USPC ................. 709/220–222, 227, 228, 245, 238
See application file for complete search history.

(56) References Cited

U.S. PATENT DOCUMENTS

| | | | |
|---|---|---|---|
| 10,749,922 B2 | 8/2020 | Klaghofer et al. | |
| 11,357,019 B2 * | 6/2022 | Tietsch | ............... H04L 65/1069 |
| 2019/0149587 A1 * | 5/2019 | Klaghofer | ............. H04M 7/006 |
| | | | 709/219 |
| 2020/0413419 A1 | 12/2020 | Tietsch et al. | |

(Continued)

OTHER PUBLICATIONS

International Search Report dated Nov. 15, 2023, issued in International Patent Application No. PCT/KR2023/012107.

(Continued)

*Primary Examiner* — Kenneth R Coulter
(74) *Attorney, Agent, or Firm* — Jefferson IP Law, LLP

(57) ABSTRACT

The disclosure relates to a 5$^{th}$ generation (5G) or 6$^{th}$ generation (6G) communication system for supporting higher data transmission rates. A method of operating a real-time communication application function (RTC AF) entity in a wireless communication system is provided. The method includes receiving a service provisioning parameter (parameter for service provisioning) from an RTC service provider, generating a media session quality of service (QoS) parameter (parameter for AF session with QoS), based on the service provisioning parameter, transmitting the media session QoS parameter to a policy control function (PCF), generating a stream endpoint (SEP) configuration parameter (parameter for SEP configuration), based on the service provisioning parameter, and transmitting the stream endpoint configuration parameter to a stream endpoint entity.

19 Claims, 26 Drawing Sheets

(56) References Cited

U.S. PATENT DOCUMENTS

| 2022/0038941 A1* | 2/2022 | Han | ................. | H04W 28/0268 |
| 2024/0237087 A1* | 7/2024 | Yang | .................... | H04W 76/10 |

OTHER PUBLICATIONS

3GPP; TSG SA; Study on XR (Extended Reality) and media services (Release 18), 3GPP TR 23.700-60 V0.3.0, May 31, 2022.

Gianluca Perna et al., Real-Time Classification of Real-Time Communications, Jan. 1, 2022.

R. Ejzak, Media multiplexing with Real-time Transport Protocol (RTP) subsessions, In: Internet-Draft, draft-ejzak-avtcore-rtp-subsessions-02, Oct. 23, 2012.

Extended European Search Report dated Jul. 14, 2025, issued in a European Patent Application No. 23855140.2.

3rd Generation Partnership Project; Technical Specification Group Services and System Aspects; IP Multimedia Subsystem (IMS); Multimedia Telephony; Media handling and interaction (Release 17), 3GPP Standard; Technical Specification; 3GPP TS 26.114, 3rd Generation Partnership Project (3GPP), Mobile Competence Centre ; 650, Route Des Lucioles ; F-06921 Sophia-Antipolis Cedex ; France, vol. SA WG4, No. V17.5.0, Jun. 17, 2022, pp. 1-484, XP052183003.

* cited by examiner

| 340 | 330 | 320 | 310 |
|---|---|---|---|
| IP Header | UDP Header | RTP Header | RTP Payload (PDU) |

```
0                               1                               2
0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|   ID   | len=1 |            PDU_SET_SN            |
+-+-+-+-+-+-+-+-+-+-+-+-+-+-+-+-+-+-+-+-+-+-+-+-+
```

FIG. 7C

```
 0                               1
 0 1 2 3 4 5 6 7 8 9 0 1 2 3 4 5
+-+-+-+-+-+-+-+-+-+-+-+-+-+-+-+-+
|    ID   | len=0 |S|E| reserved |
+-+-+-+-+-+-+-+-+-+-+-+-+-+-+-+-+
```

FIG. 7E

```
 0                   1                   2
 0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|   ID  | len=1 |            PDU_SN              |
+-+-+-+-+-+-+-+-+-+-+-+-+-+-+-+-+-+-+-+-+-+-+-+-+
```

FIG. 7G

```
 0                   1                   2
 0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|   ID   | len=1  |             NUM_PDU           |
+-+-+-+-+-+-+-+-+-+-+-+-+-+-+-+-+-+-+-+-+-+-+-+-+
```

FIG. 7H

```
 0                             1
 0 1 2 3 4 5 6 7 8 9 0 1 2 3 4 5
+-+-+-+-+-+-+-+-+-+-+-+-+-+-+-+-+
|   ID  | len=0 |  Importance   |
+-+-+-+-+-+-+-+-+-+-+-+-+-+-+-+-+
```

FIG. 7I

```
 0                               1
 0 1 2 3 4 5 6 7 8 9 0 1 2 3 4 5
+-+-+-+-+-+-+-+-+-+-+-+-+-+-+-+-+
|   ID  | len=0 |   Dependency  |
+-+-+-+-+-+-+-+-+-+-+-+-+-+-+-+-+
```

FIG. 7J

```
 0                               1
 0 1 2 3 4 5 6 7 8 9 0 1 2 3 4 5
+-+-+-+-+-+-+-+-+-+-+-+-+-+-+-+-+
|   ID  | len=0 |    Period     |
+-+-+-+-+-+-+-+-+-+-+-+-+-+-+-+-+
```

FIG. 7K

```
 0                             1
 0 1 2 3 4 5 6 7 8 9 0 1 2 3 4 5
+-+-+-+-+-+-+-+-+-+-+-+-+-+-+-+-+
|    ID   | len=0  | LT |  DS  |  JS  |
+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   ID  | len=5 |          PDU_SET_SN          |    NUM_PDU      |
+-+-+-+-+-+-+-+-+-+-+-+-+-+-+-+-+-+-+-+-+-+-+-+-+-+-+-+-+-+-+-+-+
+ NUM_PDU(cont.) |           PDU_SN            |
+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   ID  | len=3 |   Importance  |   Dependency  |    Period     |
+-+-+-+-+-+-+-+-+-+-+-+-+-+-+-+-+-+-+-+-+-+-+-+-+-+-+-+-+-+-+-+-+
+ LT| DS  |  JS |
+-+-+-+-+-+-+-+-+
```

FIG. 8

METHOD AND APPARATUS FOR PROVIDING MEDIA-BASED QoS FOR REAL-TIME COMMUNICATION SERVICE IN MOBILE COMMUNICATION SYSTEMS

CROSS-REFERENCE TO RELATED APPLICATION(S)

This application is based on and claims priority under 35 U.S.C. § 119(a) of a Korean patent application number 10-2022-0104152, filed on Aug. 19, 2022, in the Korean Intellectual Property Office, and of a Korean patent application number 10-2022-0181767, filed on Dec. 22, 2022, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for ensuring the quality of a real-time communication service in a wireless network, such as $5^{th}$ generation (5G).

2. Description of Related Art $5^{th}$ generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement $6^{th}$ generation (6G) mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-outlet (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio user equipment (NR UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices, which have been exponentially increasing, will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources. As described above, as various services can be provided according to the development of wireless communication systems, there is a need for a method for effectively providing these services, and more particularly, a method for efficiently transmitting media in real time for voice and video calls. this is being requested.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method by which a real-time communication service is effectively providable in a wireless communication system.

Additional aspects will be set forth in part in the description which follows and, in part, will be apparent from the description, or may be learned by practice of the presented embodiments.

In accordance with an aspect of the disclosure, a method for providing a real-time communication service is provided. The method includes provisioning packet data unit (PDU) set-based quality of service (QoS) information in a real-time communication service, requesting a policy control function (PCF) to configure a QoS-related policy, based on the PDU set-based QoS information, and generating a media session between terminals participating in the real-time communication service, based on the QoS-related policy.

In accordance with another aspect of the disclosure, a method of operating a real-time communication application function (RTC AF) entity in a wireless communication system is provided. The method includes receiving a service provisioning parameter (parameter for service provisioning) from an RTC service provider, generating a media session QoS parameter (parameter for AF session with QoS), based on the service provisioning parameter, transmitting the media session QoS parameter to a PCF, generating a stream endpoint (SEP) configuration parameter (parameter for SEP configuration), based on the service provisioning parameter, and transmitting the stream endpoint configuration parameter to a stream endpoint entity.

The service provisioning parameter may include a type and configuration information of a serviceable media codec related to at least one of advanced video coding-high definition (AVC-HD), advanced video coding-full high definition (AVC-FullHD), advanced video coding-ultra high definition (AVC-UHD), high efficiency video coding-high definition (HEVC-HD), high efficiency video coding-full high definition (HEVC-FullHD), high efficiency video coding-ultra high definition (HEVC-UHD), enhanced voice services (EVS), and enhanced advanced audio coding plus (eAAC+).

The service provisioning parameter may include a media transmission protocol. The media transmission protocol may include at least one of real-time transport protocol (RTP)/user datagram protocol (UDP)/internet protocol (IP), secure real-time transport protocol (SRTP)/datagram transport layer security (DTLS)/UDP/IP, hypertext transfer protocol (HTTP) 1.x/transmission control protocol (TCP)/IP, HTTP3/quick UDP internet connections (QUIC)/UDP, and RTP/QUIC/UDP.

The service provisioning parameter may include a PDU set marking scheme. The PDU set marking scheme may include at least one of a header extension uniform resource locator (URL), an RTP extension header uniform resource identifier (URI), a local identifier mapped to the URI in a multimedia session level or an RTP session level, and a connection mode. In case that the media transmission protocol is RTP/UDP/IP or RTP/QUIC/UDP, the PDU set marking scheme may include a URI for identification of an RTP extension header, and may further include a local identifier mapped to the URI in a multimedia session level or an RTP session level.

The service provisioning parameter may include a QoS-related parameter. The QoS-related parameter may include at least one of a PDU set delay budget (PSDB), a PDU set error rate (PSER), a loss tolerance, a PDU set maximum size, a PDU set period, an end-to-end (EtoE) delay, a bandwidth, and a delay/jitter sensitivity.

The media session QoS parameter may include media session identification information. The media session identification information may include at least one of a transmission/reception IP address, a port number, and a protocol identifier.

The media session QoS parameter may include media identification information. The media identification information may include a MIME type text string.

The media session QoS parameter may include a PDU set marking scheme. The PDU set marking scheme may include at least one of a header extension URL, an RTP extension header URI, a local identifier mapped to the URI in a multimedia session level or an RTP session level, and a connection mode. In case that the media transmission protocol is RTP, the PDU set marking scheme may include a URI for identification of an RTP extension header, and may further include a local identifier mapped to the URI in a multimedia session level or an RTP session level.

The media session QoS parameter may include a QoS-related parameter. The QoS-related parameter may include at least one of a PDU set delay budget (PSDB), a PDU set error rate (PSER), a loss tolerance, a PDU set maximum size, a PDU set period, a bandwidth, and a delay/jitter sensitivity.

The stream endpoint configuration parameter may include a type and configuration information of a serviceable media codec related to at least one of AVC-HD, AVC-FullHD, AVC-UHD, HEVC-HD, HEVC-FullHD, HEVC-UHD, EVS, and eAAC+.

The stream endpoint configuration parameter may include a media transmission protocol. The media transmission protocol may include at least one of RTP/UDP/IP, SRTP/DTLS/UDP/IP, HTTP1.x/TCP/IP, HTTP3/QUIC/UDP, and RTP/QUIC/UDP.

The stream endpoint configuration parameter may include a PDU set marking scheme. The PDU set marking scheme may include at least one of a header extension URL, an RTP extension header URI, a local identifier mapped to the URI in a multimedia session level or an RTP session level, and a connection mode. In case that the media transmission protocol is RTP/UDP/IP or RTP/QUIC/UDP, the PDU set marking scheme may include a URI for identification of an RTP extension header, and may further include a local identifier mapped to the URI in a multimedia session level or an RTP session level. The stream endpoint configuration parameter may include a QoS-related parameter. The QoS-related parameter may include at least one of a PDU set delay budget (PSDB), a PDU set error rate (PSER), a loss tolerance, a PDU set maximum size, a PDU set period, an end-to-end (EtoE) delay, a bandwidth, and a delay/jitter sensitivity.

In accordance with another aspect of the disclosure, a method of operating a user plane function (UPF) in a wireless communication system is provided. The method includes receiving a downlink packet including PDU set marking information from a stream endpoint entity, identifying a PDU set, based on the PDU set marking information, and transmitting a downlink general packet radio service (GPRS) tunneling protocol (GTP)-user plane (U) packet to a base station, based on the identified PDU set.

The PDU set marking information may include at least one of PDU set identification information and PDU set processing information.

The PDU set identification information may include at least one of a PDU set sequence number (SN), a start/end PDU of the PDU set, a PDU SN within the PDU set, and the number of PDUs within the PDU set.

The PDU set processing information may include at least one of a PDU set importance, a PDU set dependency, a PDU set period, a PDU set loss tolerance, and a PDU set delay/ jitter sensitivity.

In accordance with another aspect of the disclosure, a method of operating a UPF in a wireless communication system is provided. The method includes receiving, from a base station, an uplink general packet radio service (GPRS) tunneling protocol (GTP)-user plane (U) packet including PDU set marking information generated by a terminal, configuring a QoS, based on the PDU set marking information, and transmitting an uplink packet including the PDU set marking information to a stream endpoint entity, based on the configured QoS.

In case that the stream endpoint entity is not an endpoint entity of a media session, the PDU set marking information may be modified or removed by the stream endpoint entity.

The PDU set marking information may include at least one of PDU set identification information and PDU set processing information. The PDU set identification information may include at least one of a PDU set sequence number, a start/end PDU of a PDU set, a PDU SN within the PDU set, and the number of PDUs within the PDU set. The PDU set processing information may include at least one of a PDU set importance, a PDU set dependency, a PDU set period, a PDU set loss tolerance, and a PDU set delay/jitter sensitivity.

By an apparatus and a method according to the disclosure, a real-time communication service is effectively providable in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a concept diagram illustrating a $5^{th}$ generation (5G) system structure for a real-time communication service in a wireless communication system according to an embodiment of the disclosure;

FIG. 2 is a concept diagram illustrating a packetization process of an image data unit in a wireless communication system according to an embodiment of the disclosure;

FIG. 3 is a concept diagram illustrating a packet header in a wireless communication system according to an embodiment of the disclosure;

FIG. 4 is a concept diagram illustrating a flow of 5G system configuration information for a real-time communication service in a wireless communication system according to an embodiment of the disclosure;

FIG. 6 is a concept diagram illustrating a structure of a terminal and a server for a real-time communication service in a wireless communication system according to an embodiment of the disclosure;

FIG. 7B illustrates an example of the RTP extension header according to the disclosure;

FIG. 7C illustrates an example of the RTP extension header according to the disclosure;

FIG. 7E illustrates an example of the RTP extension header according to the disclosure;

FIG. 7G illustrates an example of the RTP extension header according to the disclosure;

FIG. 7H illustrates an example of the RTP extension header according to the disclosure;

FIG. 7I illustrates an example of the RTP extension header according to the disclosure;

FIG. 7J illustrates an example of the RTP extension header according to the disclosure;

FIG. 7K illustrates an example of the RTP extension header according to the disclosure;

FIG. 7O illustrates an example of the RTP extension header according to the disclosure;

FIG. 8 is a concept diagram illustrating a procedure of processing an uplink packet for a real-time communication service in a wireless communication system according to an embodiment of the disclosure;

Throughout the drawings, it should be noted that like reference numbers are used to depict the same or similar elements, features, and structures.

DETAILED DESCRIPTION

Figure 5:
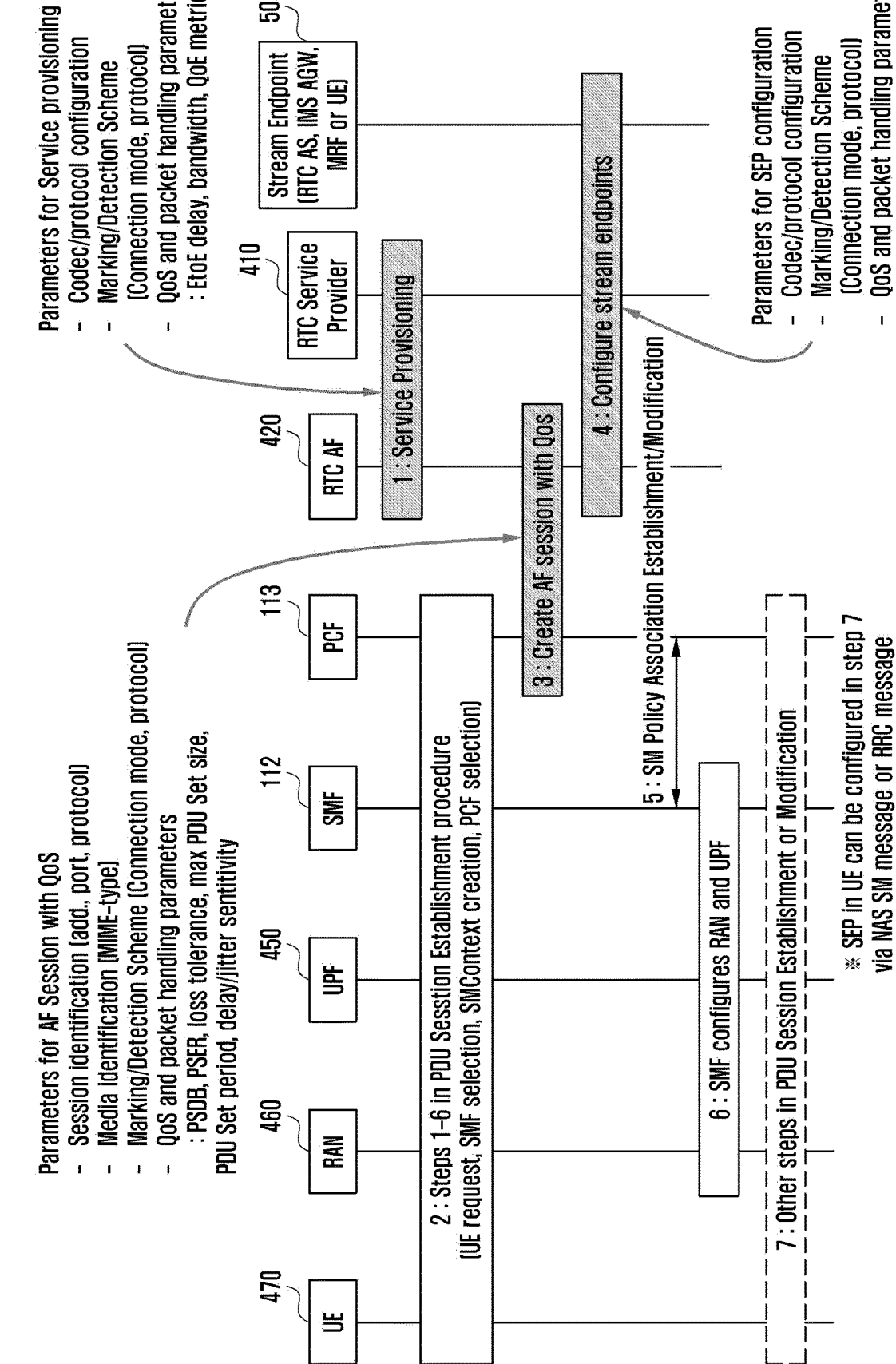
FIG. 5 is a flowchart illustrating a procedure for establishing a real-time communication media session in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Furthermore, the "unit" in the embodiments may include one or more processors.

In describing the disclosure below, a detailed description of known functions or configurations incorporated herein will be omitted when it is determined that the description may make the subject matter of the disclosure unnecessarily unclear.

In the following description, terms for identifying access nodes, terms referring to network entities (NEs), terms referring to messages, terms referring to interfaces between NEs, terms referring to various identification information, and the like are illustratively used for the sake of descriptive convenience. Therefore, the disclosure is not limited by the terms as used below, and other terms referring to subjects having equivalent technical meanings may be used.

The terms used in the disclosure are only used to describe specific embodiments, and are not intended to limit the disclosure. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, the disclosure will be described using terms and names defined in the LTE and NR standards, which are the latest standards specified by the $3^{rd}$ generation partnership project (3GPP) group among the existing communication standards, for the sake of descriptive convenience. However, the disclosure is not limited by these terms and names, and may be applied in the same way to systems that conform other standards. More particularly, the disclosure may be applied to 3GPP NR (5<sup>th</sup> generation mobile communication standard). Furthermore, based on determinations by those skilled in the art, embodiments of the disclosure may be applied to other communication systems having similar backgrounds or channel types through some modifications without significantly departing from the scope of the disclosure.

Hereinafter, the disclosure relates to a mobile communication system. When a communication service provider is unable to identify service configuration information including media information in a mobile communication system supporting a real-time communication service, that is, when media streams having different transmission (traffic) characteristics are treated as one service stream, optimization of network resources used for the service stream fails in view of each media stream, and thus deterioration of media quality or waste of network resources is inevitable. A technology for improving media quality and saving network resources by using the service configuration information including the media information in a wireless communication system will be described.

In the following description, a term indicating a signal, a term indicating a channel, a term indicating control information, terms indicating network entities, terms indicating elements of a device, and the like are exemplified for convenience of explanation. Accordingly, the disclosure is not limited to the following terms and other terms having the same technical meaning may be used.

In addition, the disclosure includes terms used in some communication specifications (e.g., 3<sup>rd</sup> generation partnership project (3GPP)) to explain various embodiments of the disclosure, but the terms merely correspond to examples. Various embodiments of the disclosure may also be easily modified and then applied to other communication systems.

Hereinafter, in a real-time communication service, a user uses an application provided by a real-time communication application provider to negotiate service configuration information including media information with a real-time media server or a different user, establishes a real-time communication media session, based on the negotiated information, and exchanges media data, such as voice and image, in real time.

In order to provide a real-time communication service, a 5G system (5GS) may include a new generation-radio access network (NG-RAN) and a user plane function (UPF) in a communication path of the real-time communication media session.

A real-time communication service may be configured by media, such as voice, image, and text, having various transmission characteristics, and when the service is treated as a best effort service, the QoS of which is not ensured, there is a high possibility of quality deterioration. For QoS ensuring of real-time communication service traffic, information for identification of uplink and downlink traffic, and a transmission characteristic of each media type are needed to be identified. A general communication system defines a packet flow that is a set of packets to which the same QoS is to be provided, and configures an operation of a network entity positioned in the communication path of the media session. Information for configuring the operation of the network entity may include information for identification of a packet belonging to the packet flow, and a QoS policy to be applied to the packet belonging to the packet flow. The information for identification of the packet belonging to the packet flow includes a transmission/reception IP address, a TCP/UDP port number, and flow identification information of an IP header. For example, in a real-time communication service including a voice and an image, when seamless transfer of voice information is important, the voice and the image may be transmitted in different packet flows, respectively. However, a data unit configuring media data may be partitioned into multiple packets in a packetization process for network transmission without being preserved, and when some of them are damaged or lost according to the characteristic of a media codec, reconstruction of a media unit at a reception node may be impossible. A packet unusable at the reception node is transferred thereto through a network, and thus network resources may be wasted. In addition, a data unit configuring media may have a different importance and mutual relation according to a media characteristic. For example, in image compression, an intra frame affects reconstruction of other frames referring to the intra frame. Therefore, a QoS is provided to a packet including the intra frame, the QoS being higher than that of a packet including a frame referring to the intra frame, whereby network resources may be efficiently used. In order to address the above issue, the disclosure provides a method by which a QoS may be provided in a unit of the data units configuring the media.

An apparatus and a method according to various embodiments of the disclosure described below enable QoS provisioning considering a media characteristic when real-time communication service providers provide a real-time service in a 5G system (5GS).

Effects which are acquirable by the disclosure are not limited to the effects described above, and other effects that have not been mentioned may be clearly understood by a person who has common knowledge in the technical field to which the disclosure belongs, from the following description.

In addition, in the following description, for convenience of explanation, terms and names defined in a specification for a 5G system are used. However, the disclosure is not limited to the terms and names, and may be applied to a system following other specifications in the same way.

Figure 1:
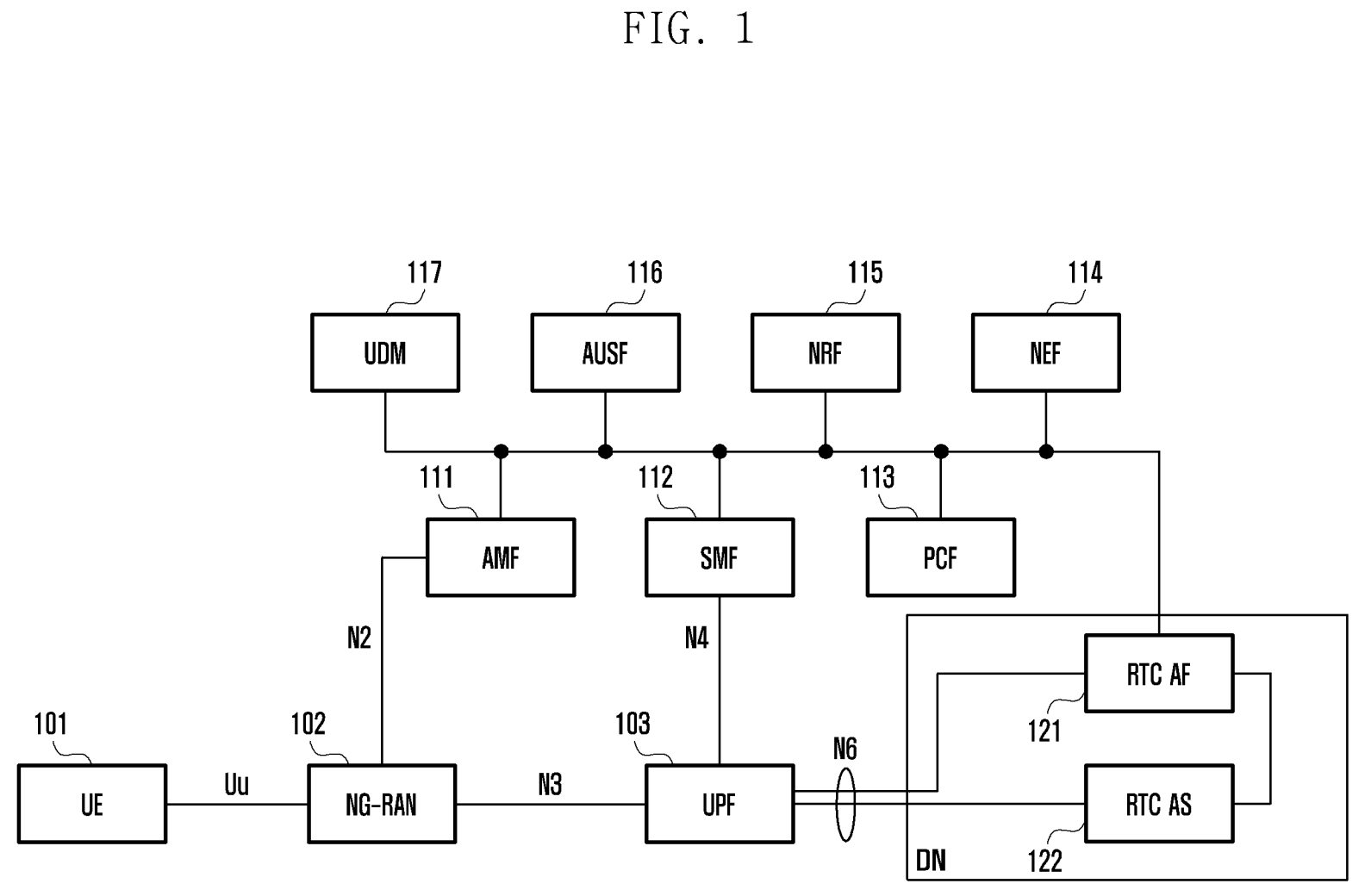

FIG. 1 is a concept diagram illustrating a 5G system structure (5G system (5GS)) for a real-time communication service in a wireless communication system according to an embodiment the disclosure.

Referring to FIG. 1, a 5GS may include a user equipment (UE) 101, an NG-RAN 102 that is a base station, a user plane function (UPF) device 103, an access and mobility management function (AMF) device 111, a session management function (SMF) device 112, a policy control function (PCF) device 113, a network exposure function (NEF) device 114, an NF repository function (NRF) device 115, an authentication server function, (AUSF) device 116, a unified data management (UDM) device 117, a real-time communication application function (RTC AF) device 121, and a real-time communication application server (RTC AS) device 122. However, the disclosure is not limited to the example, and the 5GS may include more or fewer elements than the elements illustrated in FIG. 1. In addition, each device may be called a network entity, a network function, or a network function apparatus.

Referring to FIG. 1, each network function (NF) of the 5GS will be described as a "network entity" or a "network function" itself. However, a person skilled in the art may know that an NF and/or an NF device may be implemented in one or two or more particular servers, or two or more NFs performing the same operation may be implemented in one server.

In addition, according to the disclosure, one NF or two or more NFs may be implemented as a type of one network slice in some cases. A network slice may be generated based on a particular purpose. For example, a network slice may be configured for a subscriber group to provide particular subscriber groups with the same type of services, for example, a maximum transmission rate and data usage amount, and an ensured minimum transmission rate. In addition, a network slice may be implemented according to various purposes. Network slices are obvious to a person skilled in the art, and are thus not described.

Referring to FIG. 1, it illustrates an example of interfaces between nodes. A Uu interface may be used between the UE 101 and the NG-RAN 102, an N2 interface may be used between the NG-RAN 102 and the AMF 111, an N3 interface may be used between the NG-RAN 102 and the UPF 103, an N4 interface may be used between the SMF 112 and the UPF 103, and an N6 interface may be used between the UPF 103, and the 5G RTC AF 121, and the 5G RTC AS 122 positioned in a data network (DN). The above interfaces are defined in an NR standard specification, and thus are not described. The interface between the UE and the RTC AF 121 and the RTC AS 122 will be described when a media architecture is illustrated later.

As described above, a data unit configuring media data may be partitioned into multiple packets in a packetization process for network transmission without being preserved.

Figure 2:
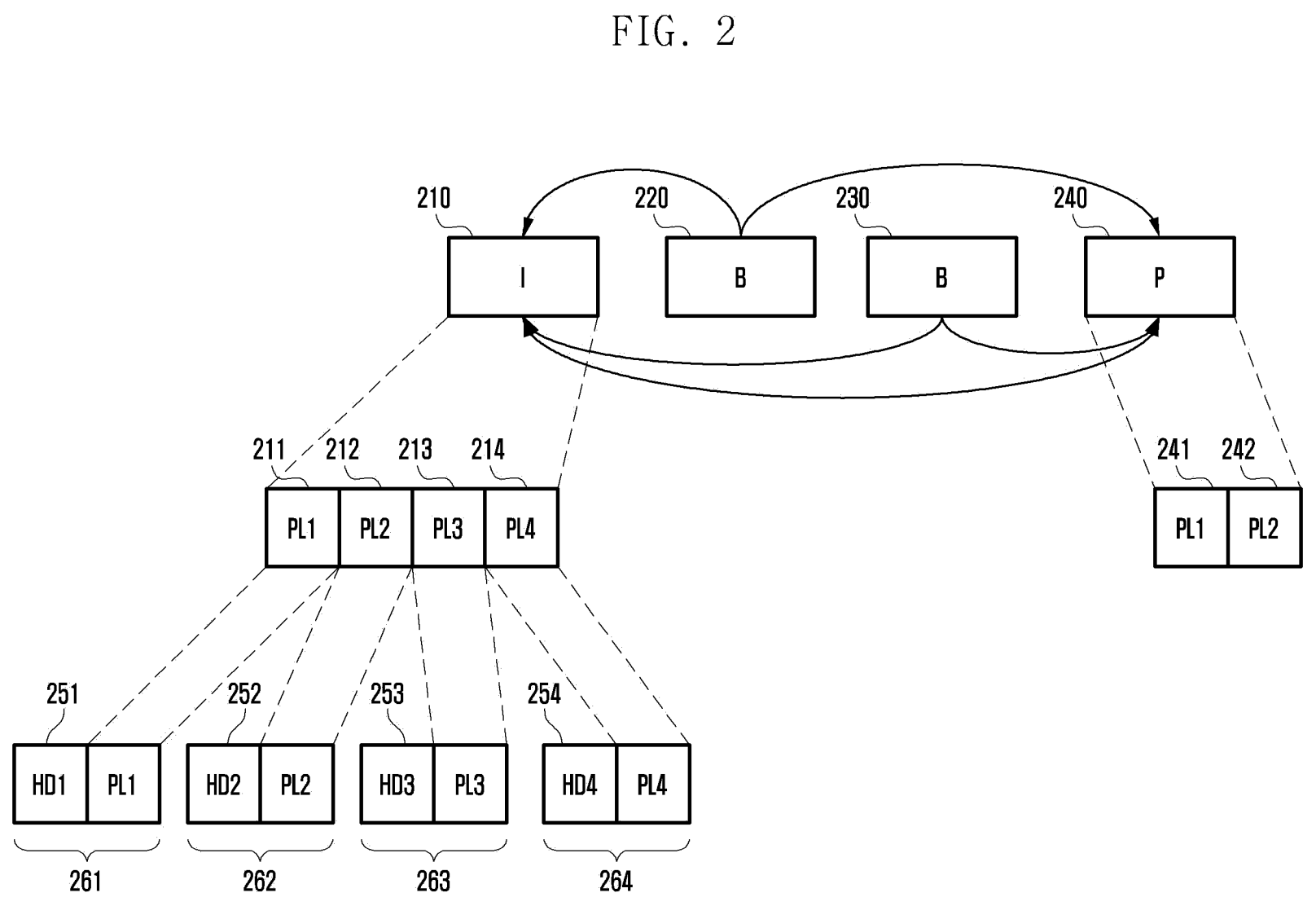

FIG. 2 is a concept diagram illustrating a packetization process of an image data unit in a wireless communication system according to an embodiment of the disclosure.

Referring to FIG. 2, media data may be configured by one I frame 210, two B frames 220 and 230, and one P frame 240, and the I frame 210 may be partitioned into four payloads which are PL1 211, PL2 212, PL3 213, and PL4 214, and may be transmitted as four packets 261, 262, 263, and 264 where packet 261 includes HD1 251 and PL1 211, where packet 262 includes HD2 252 and PL2 212, where packet 263 includes HD3 253 and PL3 213, and where packet 264 includes HD4 254 and PL4 214. Hereinafter, a set of payloads obtained by partitioning one media data unit may be called a PDU set. Referring to FIG. 2, PL1 211, PL2 212, PL3 213, and PL4 214, which are four payloads configuring the I frame 210, configures one PDU set, and PL1 241 and PL 242, which are two payloads configuring the P frame 240 may configure another PDU set.

The packet is configured by a header and a payload, the header may include information required for, in a network, processing the packet and transmitting the processed packet to a destination, and the payload may include information required for processing media data by a reception node.

Figure 3:
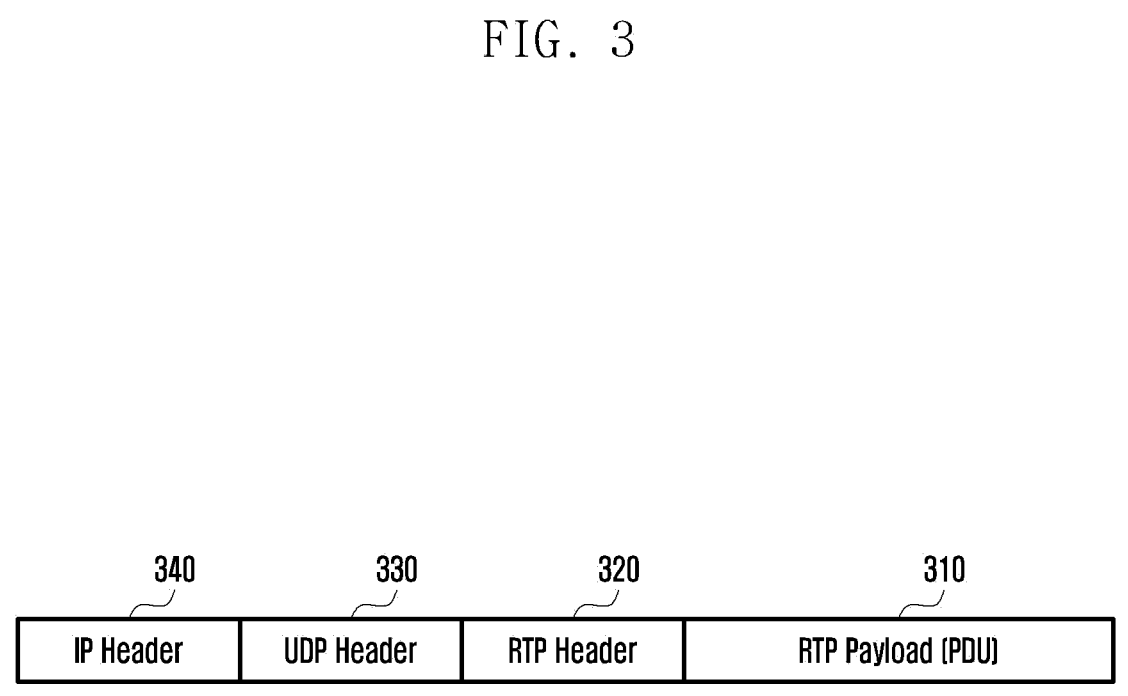

FIG. 3 is a concept diagram illustrating a packet header in a wireless communication system according to an embodiment of the disclosure.

Referring to FIG. 3, in order to transmit a PDU 310, an RTP header 320, a UDP header 330, and an IP header 340 may be added. In order to provide a QoS considering a media characteristic, network devices positioned in a real-time media transmission path may identify and analyze media data included in the payload, and determine a packet processing scheme based on the relation with other packets. The above operation may be possible in a network designed for a particular purpose, but it may be realistically impossible to apply the same operation to a network device required to process a lot of packets at a high speed. Therefore, the disclosure may include a procedure of selectively using, in a network, PDU set marking schemes by which information on a PDU set is provided using expansion of various Internet protocol headers, and pieces of signaling information for the procedure.

A real-time media session described above may be divided into several parts. For example, in a real-time communication service connecting user A and user B, media data may be transmitted in a direct path connecting user A and user B or transmitted via a server positioned in a middle network. Hereinafter, a network server performing PDU set marking is called a stream endpoint server, and a terminal performing PDU set marking may be called a stream endpoint terminal.

Figure 4:
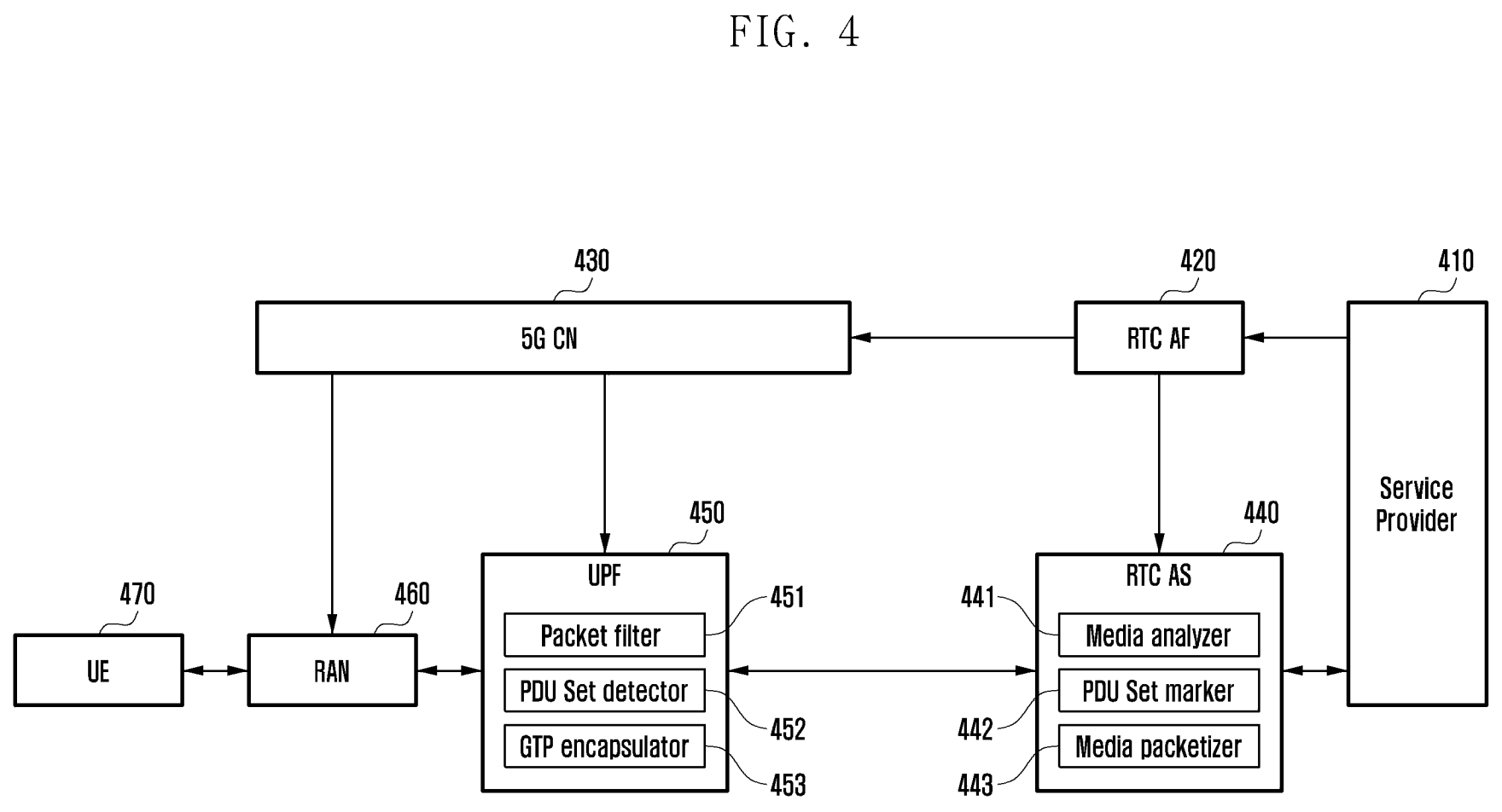

FIG. 4 is a concept diagram illustrating a flow of 5G system configuration information for a real-time communication service in a wireless communication system according to an embodiment of the disclosure.

Referring to FIG. 4, an RTC AF 420 may request, based on service configuration information provided by an RTC service provider 410, a 5G CN 430 to establish a real-time communication media session including a QoS configuration parameter. The QoS configuration parameter may include information on a PDU set marking scheme. When the session establishment request is successful, the RTC AF 420 may configure an RTC AS 440 to serve as a stream endpoint server, and the 5G CN 430 may configure a UPF 450 and a RAN 460 positioned in a path of the real-time communication media session. When a service is initiated, the RTC AS 440 may transmit, to the UPF 450, a media packet to which PDU set marking has been applied. The PDU set marking may include a media analysis process using a media analyzer 441, a PDU set-related information configuring process using a PDU se market 442, and a packetization process using a media packetizer 443. The UPF 450 having received the media packet may identify packets included in the real-time communication media session by using a packet filter 451, and identify a PDU set and process a packet by using PDU set marking scheme information included in configuration information of the 5G CN 430 through PDU set detector 452. Thereafter, the UPF transfers a packet to which a GTP header has been added to the RAN 460, and the RAN 460 may add PDU set-related information to the GTP header to provide a PDU set-based QoS.

A UE 470 may be the same or similar to the UE 101 illustrated in FIG. 1. The RAN 460 may be the same or similar to the NG-RAN 102 illustrated in FIG. 1. The UPF 450 may be the same or similar to the UPF 103 illustrated in FIG. 1. The RTC AS 440 may be the same or similar to the RTC AS 122 illustrated in FIG. 1. The RTC AF 420 may be the same or similar to the RTC AF 121 illustrated in FIG. 1.

FIG. 5 is a flowchart illustrating a procedure for establishing a real-time communication media session in a wireless communication system according to an embodiment of the disclosure.

Referring to FIG. 5, process 1 is a process of configuring a media-based QoS provisioning service by the RTC AF 420, and a service provisioning parameter (parameters for service provisioning) provided by the RTC service provider 410 may be used. For example, the RTC service provider 410 may transmit a service provisioning parameter to the RTC AF 420. The RTC AF 120 may receive a service provisioning parameter from the RTC service provider 410. The service provisioning parameter may include at least one of a codec/protocol configuration, a marking/detection scheme, and QoS and packet handling parameters. The marking/detection scheme may include at least one of a connection mode and a protocol. The QoS and packet handling parameter may include at least one of EtoE delay, bandwidth, and QoE metric.

Process 2 may include a process required to select the PCF 113 to communicate with the RTC AF 420 in a general session establishment procedure (PDU session establishment procedure). This process may include a PDU session establishment request (UE request) of the UE 470, an SMF selection, an SMContext creation, and a PCF selection process. For example, the UE 470, the RAN 460, the UPF 450, the SMF 112, and the PCF 113 may perform a session establishment procedure.

Process 3 is a process of requesting, by the RTC AF 420, the PCF 113 to allocate resources for a media session, and a media session QoS parameter (parameters for AF session with QoS) may be provided to the PCF 113. In another embodiment of the disclosure, the media session QoS parameter may be provided to a 5GS before establishment of a media session. For example, the RTC AF 420 may transmit a media session QoS parameter to the PCF 113. The PCF 113 may receive a media session QoS parameter from the RTC AF 420. The media session QoS parameter may include at least one of a session identification (add., port, or protocol), a media identification (MIME-type), a marking/detection scheme (connection mode or protocol), and QoS and packet handling parameters. The QoS and packet handling parameter may include at least one of PSDB, PSER, loss tolerance, max PDU set size, PDU set period, and delay/jitter sensitivity.

Process 4 is a process of configuring a stream endpoint 500 by the RTC AF 420, and the RTC AF 420 may provide a stream endpoint configuration parameter (parameters for stream endpoint (SEP) configuration) to the stream endpoint 500. The RTC AF 420 may transmit a stream endpoint configuration parameter to the stream endpoint 500. The stream endpoint 500 may receive a stream endpoint configuration parameter from the RTC AF 420. The stream endpoint configuration parameter may include at least one of a codec/protocol configuration, a marking/detection scheme (connection mode or protocol), and a QoS and packet handling parameter. The stream endpoint configuration process may vary according to the position and characteristic of the stream endpoint, and a detailed contents will be described later. The stream endpoint may be called the stream endpoint 500. For example, the stream endpoint 500 may be the RTC AS 440, an IMS access gateway (IMS AGW), a media resource function (MRF), or a terminal.

Process 5 is a process of generating and transferring, to the SMF 112, a policy and charging control (PCC) rule by the PCF 113, and the PCC rule may include a PDU set-related QoS parameter. The PCF 113 may transmit a PCC rule to the SMF 112. The SMF 112 may receive a PCC rule from the PCF 113. The PCF 113 and the SMF 112 may perform an operation for SM policy association establishment/modification.

Process 6 is a process of configuring the RAN 460 and the UPF 450 by the SMF 112 (SMF configures RAN and UPF), and the SMF 112 may use a PCC rule obtained from the PCF 112, to generate a QoS profile and an N4 rule, distribute the N4 rule to the UPF 450, and distribute the QoS profile to the RAN 460 via the AMF 111.

Process 7 is used to collectively call processes (other processes in PDU session establishment or modification) after process 6 in a general session establishment process, and may include a process of responding to a PDU session establishment request of the UE 470 and configuring access network resources. The SEP 500 of the UE 470 may be configured using a NAS SM message or RRC message in process 7 (SEP in UE can be configured in process 7 via NAS SM message or RRC message).

A service provisioning parameter of process 1 may include the following information.

A type and configuration information of a serviceable media codec: AVC-HD, AVC-FullHD, AVC-UHD, HEVC-HD, HEVC-FullHD, HEVC-UHD, EVS, eAAC+, or the like.

Media transmission protocol: RTP/UDP/IP, SRTP/DTLS/UDP/IP, HTTP1.x/TCP/IP, HTTP3/QUIC/UDP, RTP/QUIC/UDP, or the like.

PDU set marking scheme: A header extension URL, an RTP extension header URI, a local identifier mapped to the URI in a multimedia session level or an RTP session level, a connection mode (detailed contents will be described later), or the like.

QoS-related parameter: A PDU set delay budget (PSDB), a PDU set error rate (PSER), a loss tolerance, a PDU set maximum size, a PDU set period, an end-to-end (EtoE) delay, a bandwidth, a delay/jitter sensitivity, or the like.

A media session QoS parameter of process 3 may include the following information.

Media session identification information: A transmission/reception IP address, a port number, a protocol identifier, or the like.

Media identification information: MIME type text strings

PDU set marking scheme: A header extension URL, an RTP extension header URI, a local identifier mapped to the URI in a multimedia session level or an RTP session level, a connection mode (detailed contents will be described later), or the like.

QoS-related parameter: A PDU set delay budget (PSDB), a PDU set error rate (PSER), a loss tolerance, a PDU set maximum size, a PDU set period, a bandwidth, a delay/jitter sensitivity, or the like.

A stream endpoint configuration parameter of process 4 may include the following information.

A type and configuration information of a serviceable media codec: AVC-HD, AVC-FullHD, AVC-UHD, HEVC-HD, HEVC-FullHD, HEVC-UHD, EVS, eAAC+, or the like.

Media transmission protocol: RTP/UDP/IP, SRTP/DTLS/UDP/IP, HTTP1.x/TCP/IP, HTTP3/QUIC/UDP, RTP/QUIC/UDP, or the like.

1 PDU set marking scheme: A header extension URL, an RTP extension header URI, a local identifier mapped to the URI in a multimedia session level or an RTP session level, a connection mode (detailed contents will be described later), or the like.

QoS-related parameter: A PDU set delay budget (PSDB), a PDU set error rate (PSER), a loss tolerance, a PDU set maximum size, a PDU set period, an end-to-end (EtoE) delay, a bandwidth, a delay/jitter sensitivity, or the like.

As described above, a stream endpoint performing PDU set marking may be a stream endpoint server positioned in a network or a stream endpoint terminal owned by a user. The stream endpoint server may have different configuration processes according to a hosting environment or a basis network.

For example, in a case of an IP multimedia subsystem (IMS) network, an IMS access gateway (IMS-AGW) or a media resource function (MRF) may perform a function of a stream endpoint server. A stream endpoint parameter may be configured by an IMS application server (AS) or a service provider internal equipment configuration protocol. A multimedia telephony service for IMS (MTSI) client positioned in a terminal may perform a stream endpoint terminal function of an IMS network, and a stream endpoint parameter may be configured by an application program server or a terminal management server, such as OMA DM.

Figure 6:
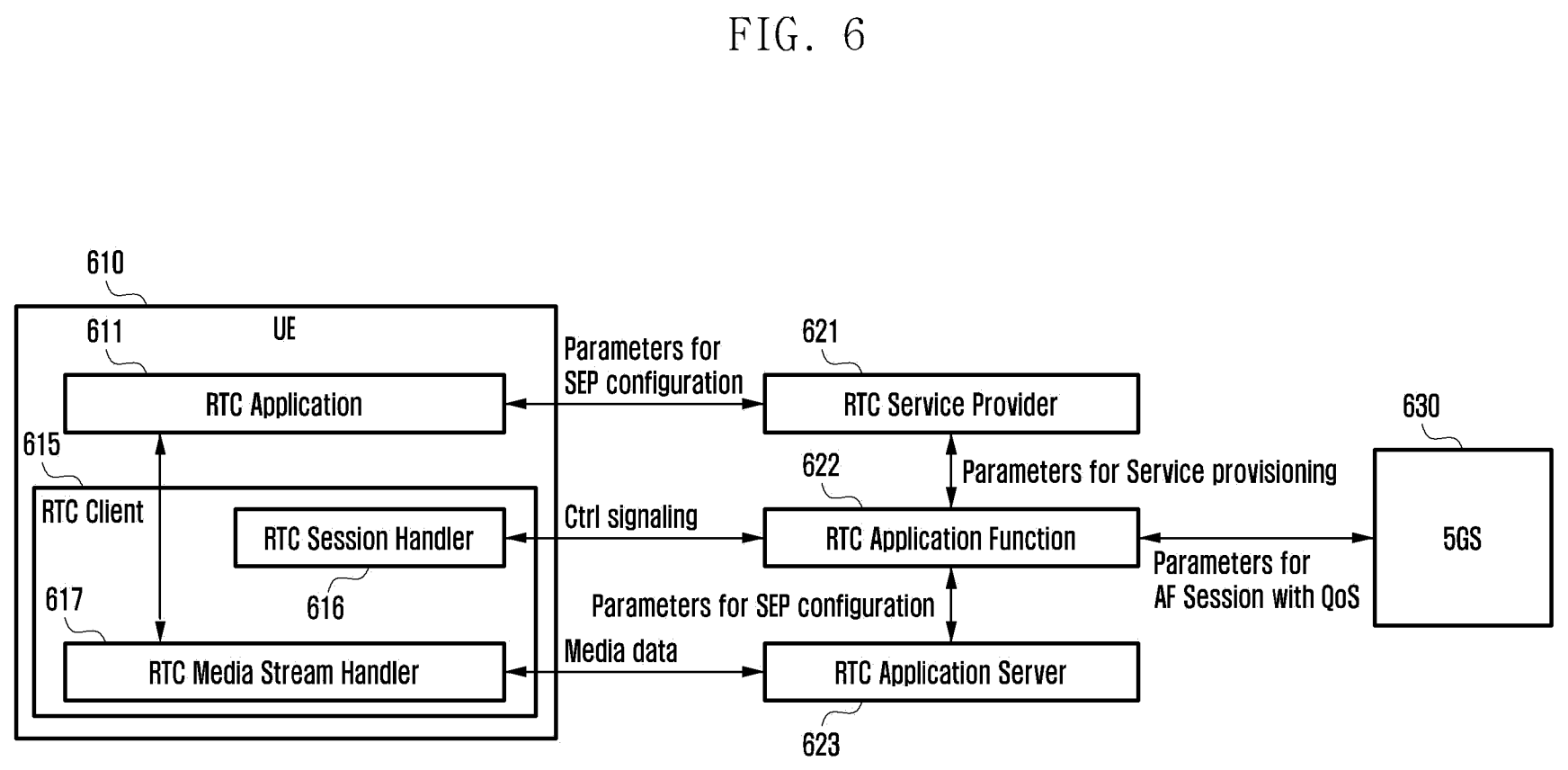

FIG. 6 is a concept diagram illustrating a structure of a terminal and a server for a real-time communication service in a wireless communication system according to an embodiment of the disclosure.

Referring to FIG. 6, a user equipment (UE) 610 may include an RTC application 611 and an RTC client 615. The RTC client 615 may include an RTC session handler 616 and an RTC media stream handler 617.

A stream endpoint terminal function may be provided as a combination of functions provided by the RTC application 611 and the RTC client 615, or a separate function. A stream endpoint parameter (parameters for SEP configuration) for the stream endpoint terminal function may be provided to the UE 610 by an RTC service provider 621 via the RTC application 611. The stream endpoint parameter may be provided to the UE 610 via an RTC application function 622 and the RTC session handler 616. The stream endpoint parameter may be provided to the UE 610 from a 5G network function by using a NAS SM message or an RRC message.

The RTC application function 622 may generate a media session QoS parameter (parameters for AF session with QoS) and a stream endpoint configuration parameter (parameters for SEP configuration), based on a service-level agreement (SLA) or a service provisioning parameter (parameters for service provisioning) provided by the RTC service provider 621. The media session QoS parameter may be used as an input for QoS configuration of a system of a 5GS 630. The stream endpoint configuration parameter may be used as an input for configuration of a stream endpoint terminal function and a stream endpoint server function provided by an RTC application server 623. In another embodiment of the disclosure, a stream endpoint server provided by the RTC application server 623 may be configured by the RTC service provider 621.

In an embodiment of FIG. 6 described above, media data being exchanged between the RTC media stream handler 617 of the UE 610 and the RTC application server 623 is illustrated. However, media data may be directly exchanged between the RTC media stream handlers 617 of user terminals according to a service.

The UE 610 may be the same or similar to the UE 470 illustrated in FIG. 4. The RTC AF 622 may be the same or similar to the RTC AF 420 illustrated in FIG. 4. The RTC AS 623 may be the same or similar to the RTC AS 440 illustrated in FIG. 4. The RTC service provider 621 may be the same or similar to the RTC service provider 410 illustrated in FIG. 4. The 5GS 630 may be the same or similar to the 5G CN 430 illustrated in FIG. 4.

Figure 7A:
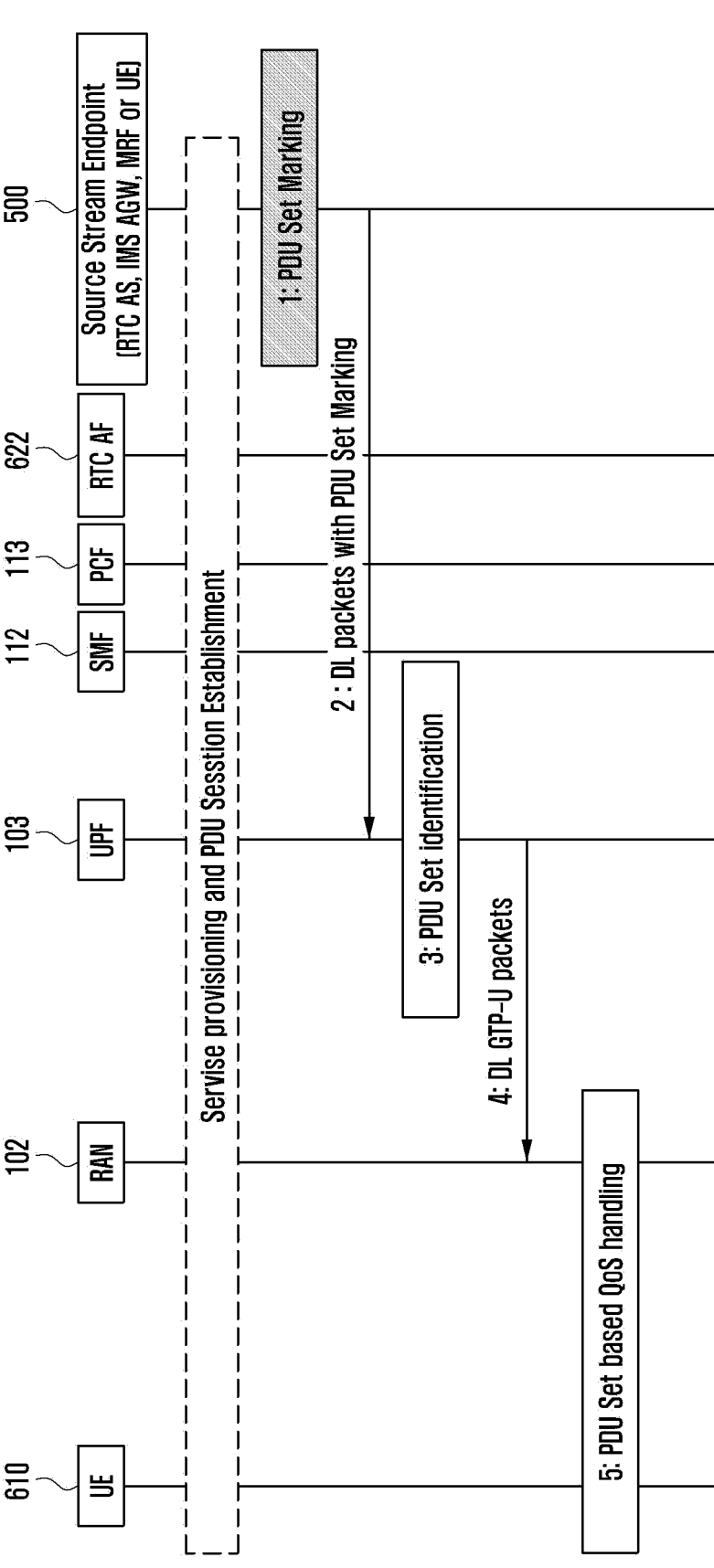
FIG. 7A is a flowchart illustrating a procedure of processing a downlink packet for a real-time communication service in a wireless communication system according to an embodiment of the disclosure.

FIG. 7A is a flowchart illustrating a procedure of processing a downlink packet for a real-time communication service in a wireless communication system according to an embodiment of the disclosure.

Referring to FIG. 7A, process 1 may be a process of generating, by the stream endpoint 500, a downlink packet to which a PDU set marking scheme has been applied. The PDU set marking scheme may be a scheme configured in a service provisioning and media (PDU) session establishment process described above. A detailed parameter may be determined through dynamic negotiation between stream endpoints before transmission of a real media stream. A parameter for the dynamic negotiation may be transferred through a protocol message, such as a session initiation protocol (SIP), a session description protocol (SDP), or the like. The RTC AF 622 may transfer a detailed parameter of a PDU set marking scheme which is determined through the dynamic negotiation, to the PCF 113 directly or via the NEF 114. A detailed parameter of a PDU set marking scheme which is received by the PCF 113 may be transferred to the UPF 103 through an internal information transfer process of a 5GS.

Process 2 is a process in which a packet transmitted from the stream endpoint 500 is transferred to the UPF 103 functioning as a PDU session anchor. The stream endpoint 500 may transmit a DL packet including PDU set marking to the UPF 103. The UPF 103 may receive a DL packet including PDU set marking from the stream endpoint 500. A packet transmission path of process 2 may affect determination of a connection mode for selection of a PDU set marking scheme, described later.

Process 3 is a process in which the UPF 103 identifies PDU sets, based on PDU set marking, and recognize the relation between the identified PDU sets (perform PDU set identification) to determine a QoS and packet handling scheme to be applied to each PDU set. In process 3, the UPF 103 may add PDU set-related information to a GTP header so as to allow a middle UPF (not illustrated) positioned in a path leading to the RAN 102 and the RAN 102 to provide a PDU set-based QoS.

Process 4 is a process of transferring a packet to the RAN 102 through a general packet radio service (GPRS) tunneling protocol (GTP) tunnel. The UPF 103 may transmit a DL GTP-user plane (U) packet to the RAN 102. The RAN 102 may receive a DL GTP-U packet from the UPF 103.

Process 5 is a process in which the RAN 102 applies, to a packet, a PDU set-based QoS according to PDU set-related information of a GTP header and a policy determined in a media session establishment/modification process, and then transmits the packet to the UE 610. The RAN 102 may transmit a PDU set (PDU set based QoS handling) processed based on a PDU set-based QoS to the UE 610. The UE 610 may receive a PDU set processed based on a PDU set-based QoS from the RAN 102.

As described above, a packet transmission path between the stream endpoint 500 and the UPF 103 may affect determination of a connection mode for selection of a PDU set marking scheme. A connection mode according to the disclosure may include the following contents.

IPv4HO (IPv6HO): The stream endpoint 500 and the UPF 103 are connected to IPv4 (IPv6) network apparatuses (e.g., routers) preserving a differentiated service code point (DSCP) value of an IP packet header. A PDU set marking scheme may be configured by a combination of a DSCP value of IPv4 (IPv6) and a higher layer transmission protocol (extension) header.

IPv4HE (IPv6HE): The stream endpoint 500 and the UPF 103 are connected to an IPv4 (IPv6) network apparatuses (e.g., routers) capable of changing a differentiated service code point (DSCP) value of an IP packet header. A PDU set marking scheme may be configured by a higher layer transmission protocol (extension) header.

N6Tunnel/GTP-U: The server of the steam endpoint 500 and the UPF 103 are connected through an N6Tunnel using GTP encapsulation by GTP encapsulator 453. A PDU set marking scheme may be configured by a GTP-U extension header.

PDU set-related information according to the disclosure may be configured as below.

PDU set identification information

PDU set sequence number: A sequence number of a PDU set, an unsigned integer number.

Start/end PDU of the PDU set: The first and last PDUs belonging to a PDU set. This may be signaled as a separate flag having a Boolean value, or may be indirectly signaled through a PDU SN and the number of PDUs belonging to a PDU set, described below.

PDU SN within a PDU set: A sequence number of a PDU belonging to a PDU set, an unsigned integer number.

Number of PDUs within a PDU set: The number of PDUs belonging to a PDU set.

PDU set processing information

PDU set importance: The importance of a PDU set. Unsigned integer number.

PDU set dependency: The dependency between PDU sets. This may be signaled as a list or the number of PDU set sequence numbers being in a dependency relation.

PDU set period: The interval/period of a PDU set. This may be signaled as a time window or a predetermined period in which one PDU set is transmitted, and may be signaled in a unit of ms.

PDU set loss tolerance: A loss tolerance of a PDU set, an unsigned integer number. In a case where this value is 0, when any one of PDUs belonging to a PDU set is lost, the entire PDU set may be unavailable in an application layer.

PDU set delay/jitter sensitivity: A delay and jitter sensitivity, an unsigned integer number. If this value is 0, retransmission is possible.

A PDU set marking scheme is a scheme for transferring PDU set-related information to a network apparatus or an application layer, and may be configured by in-band information that is recorded in a packet by using a header, an extension header, a payload header, or the like, of a higher layer transmission protocol, and out-band information that is transferred through a separate data structure. For example, the PDU set identification information may be in-band information. The PDU set processing information may be out-band information or a combination of in-band information and out-band information. The out-band information may be transferred using control plane signaling information of 5G or a message of a media session control protocol, such as SIP/SDP. The out-band information may be transferred to a UPF via a PCF by using a detailed parameter of a PDU set marking scheme.

A PDU set marking scheme according to the disclosure may use an RTP extension header. Whether to use the RTP extension header and a value of an ID field may be negotiated through out-band signaling, such as SDP. For example, PDU set identification information described above may be transferred using an RTP extension header is illustrated in FIGS. 7B to 7Q.

Figure 7B:
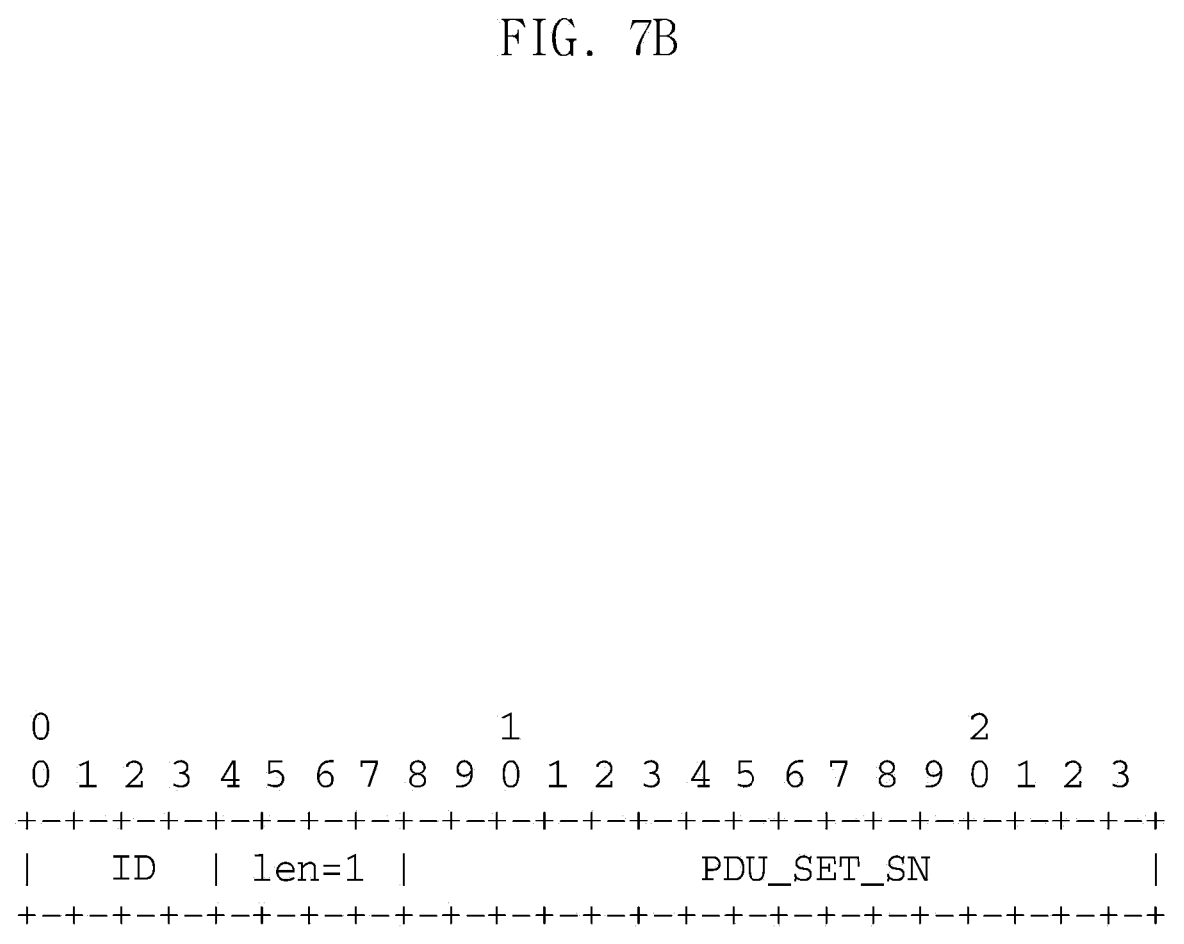

FIG. 7B illustrates an example of the RTP extension header according to the disclosure. For example, FIG. 7B shows urn:3gpp:pdu-set-SN.

PDU_SET_SN: A 16-bit field indicating a sequence number of a PDU set including a payload of a packet including this extension header.

Figure 7C:
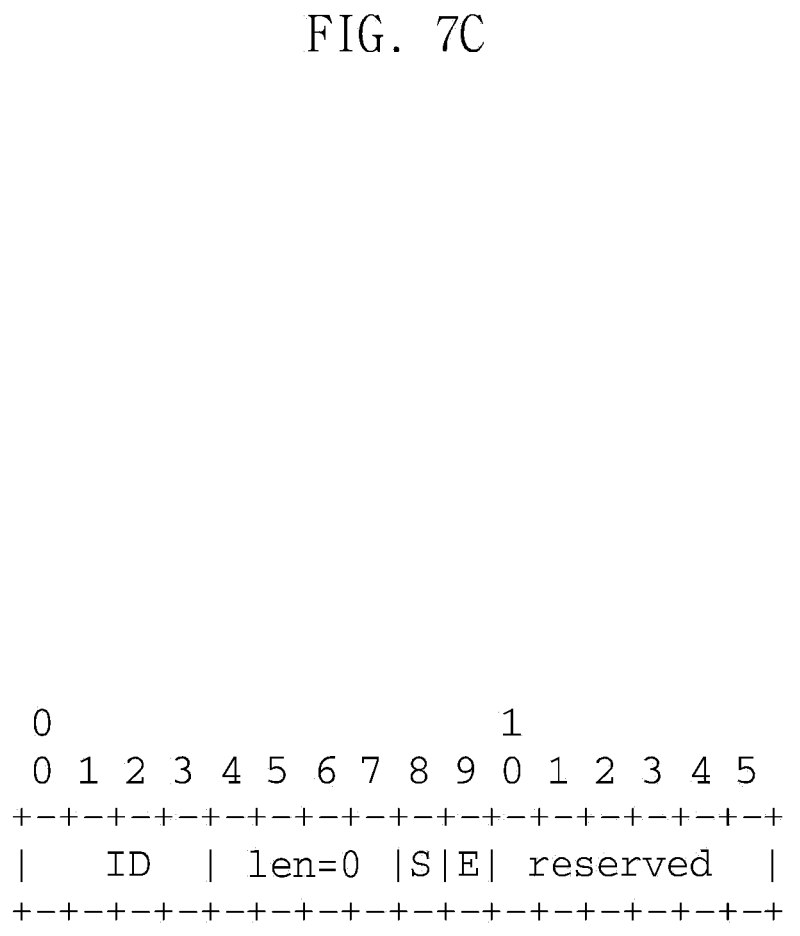

FIG. 7C illustrates an example of the RTP extension header according to the disclosure. For example, FIG. 7C shows urn:3gpp:pdu-set-SE.

S: A 1-bit field having a value of 1 only when a payload of a packet including this extension header is the first PDU of a PDU set, and otherwise, having a value of 0.

E: A 1-bit field having a value of 1 only when a payload of a packet including this extension header is the last PDU of a PDU set, and otherwise, having a value of 0.

Figure 7D:
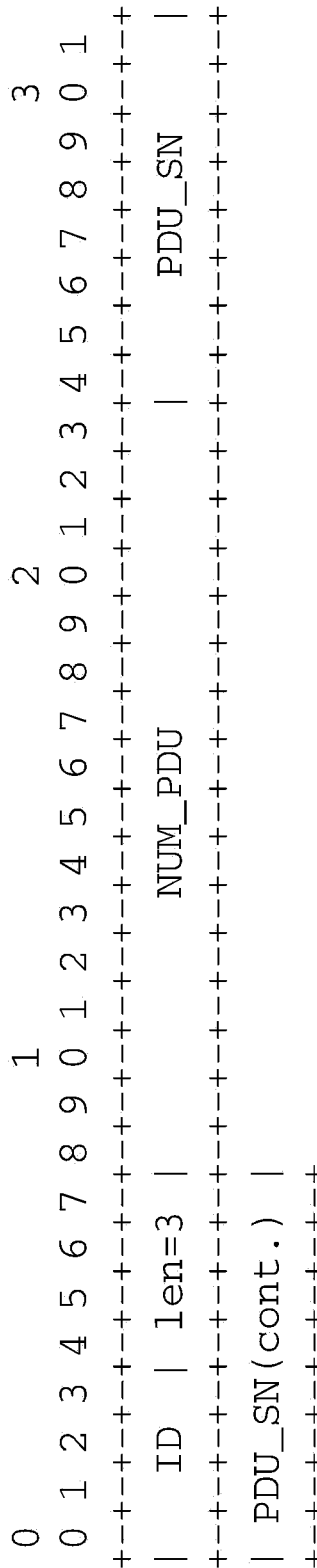
FIG. 7D illustrates an example of the RTP extension header according to the disclosure.

FIG. 7D illustrates an example of the RTP extension header according to the disclosure. For example, FIG. 7D shows urn:3gpp:pdu-SN.

NUM_PDU: A 16-bit field indicating the number of PDUs in a PDU set to which a payload of a packet including this extension header belongs.

PDU SN: A 16-bit field indicating the sequence number of a current PDU in a PDU set to which a payload of a packet including this extension header belongs.

Figure 7E:
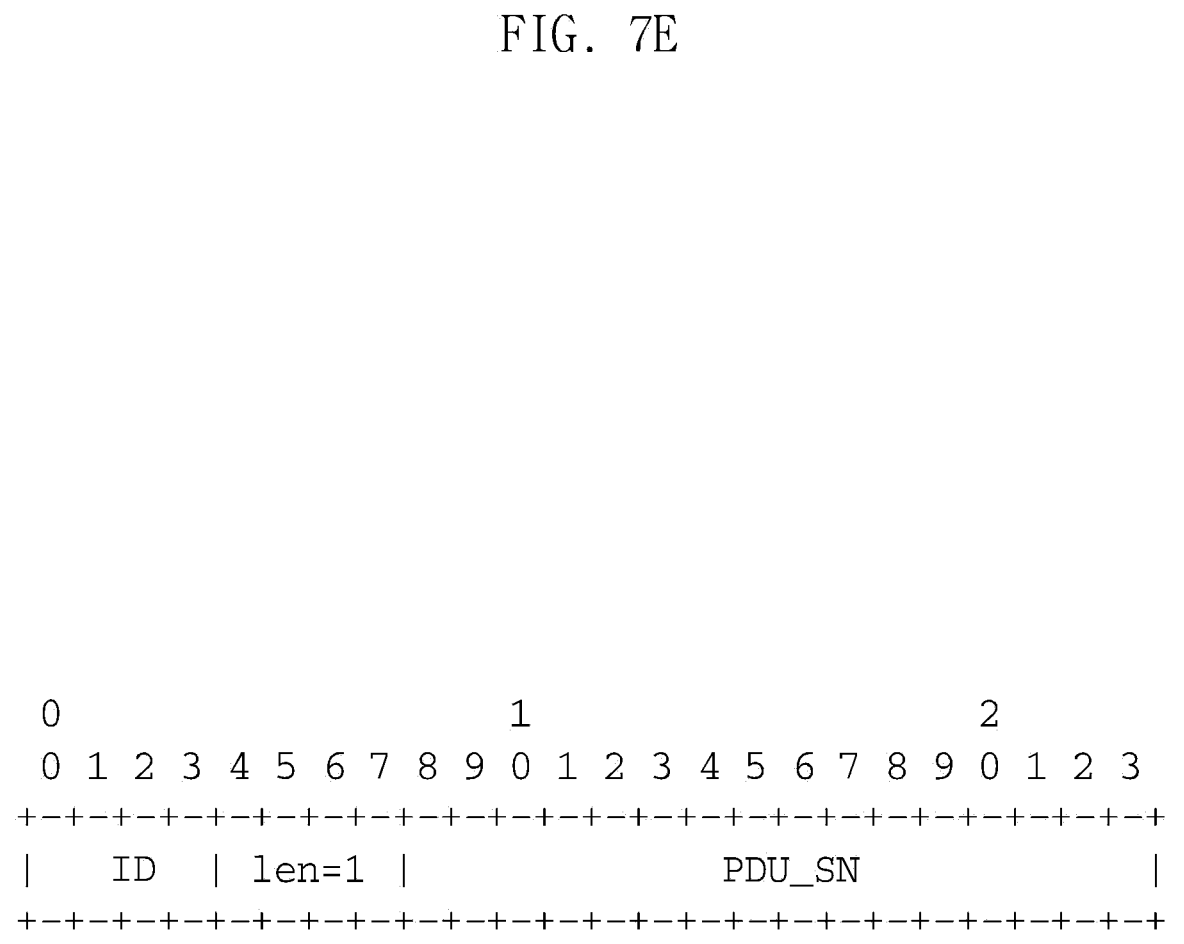

FIG. 7E illustrates an example of the RTP extension header according to the disclosure. For example, FIG. 7E shows urn:3gpp:pdu-PSN PDU_SN: A 16-bit field indicating the sequence number of a current PDU in a PDU set to which a payload of a packet including this extension header belongs.

Figure 7F:
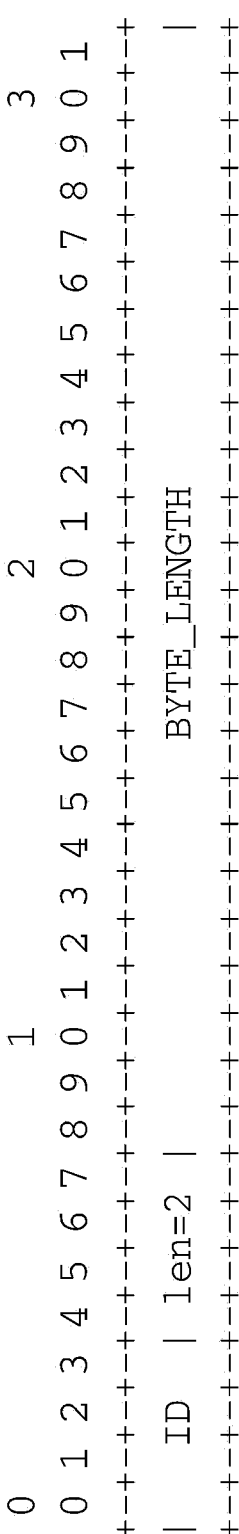
FIG. 7F illustrates an example of the RTP extension header according to the disclosure.

FIG. 7F illustrates an example of the RTP extension header according to the disclosure. For example, FIG. 7F shows urn:3gpp:pdu-set-BL.

BYTE LENGTH: A 24-bit field indicating the byte-unit length of a PDU set to which a payload of a packet including this extension header belongs. The byte-unit length of the PDU set represents the size of application layer data input to an RTP layer, and the length of an RTP protocol header and an extension header may be excluded.

Figure 7G:
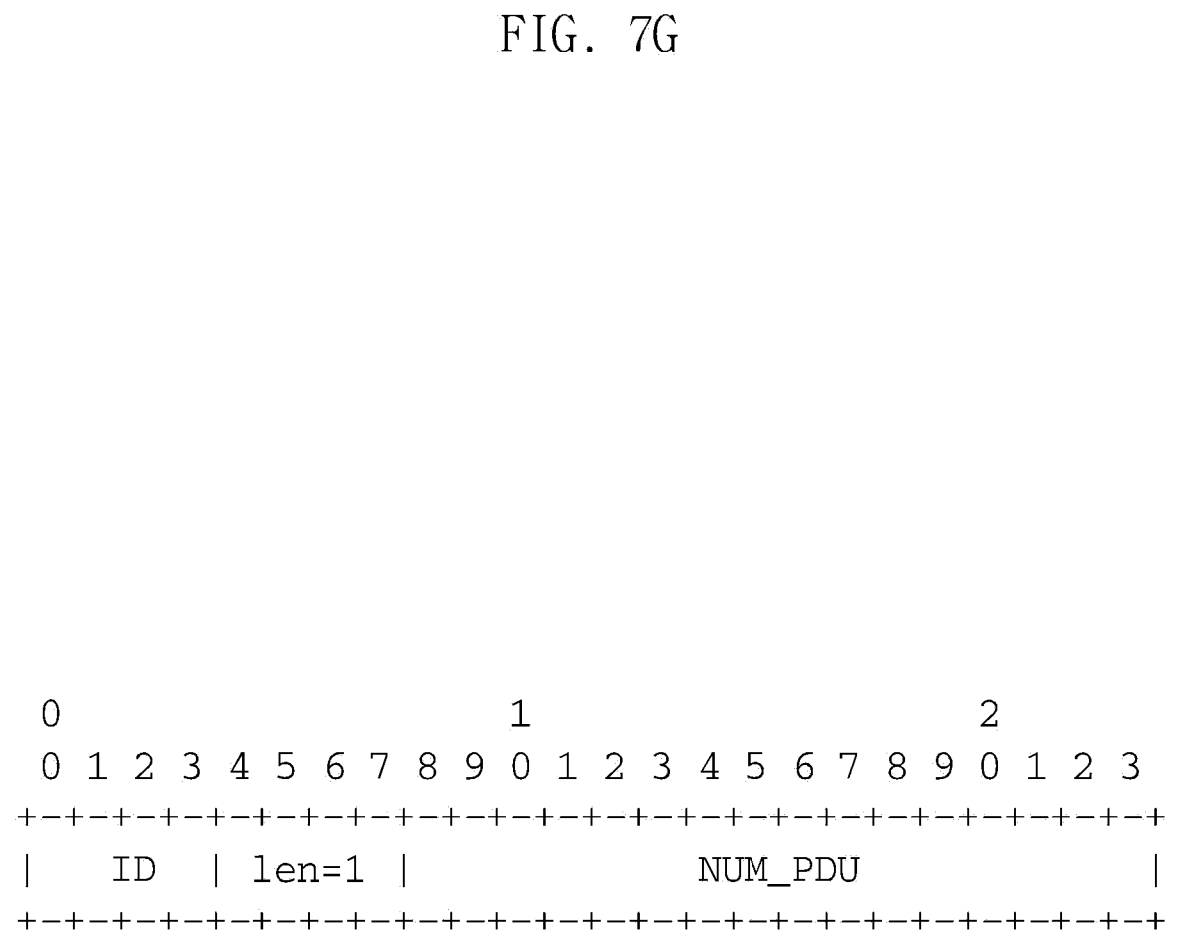

FIG. 7G illustrates an example of the RTP extension header according to the disclosure. For example, FIG. 7G shows urn:3gpp:pdu-set-NP.

NUM_PDU: A 16-bit field indicating the number of PDUs in a included in a PDU set to which a payload of a packet including this extension header belongs.

For example, PDU set processing information described above may be transferred using an RTP extension header as follow.

Figure 7H:
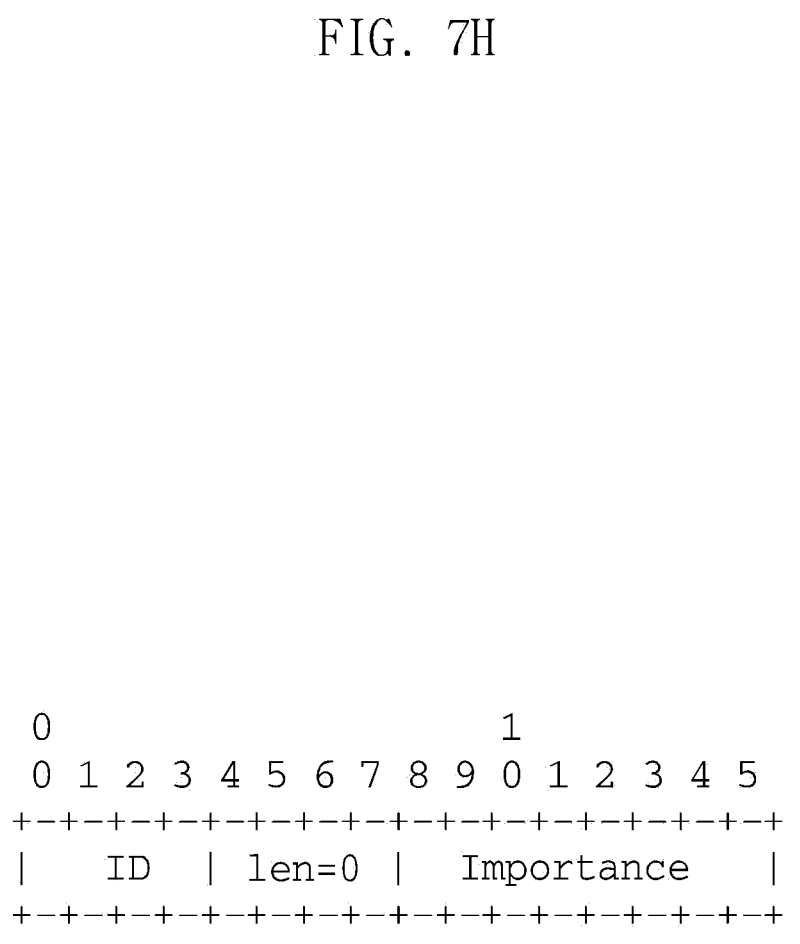

FIG. 7H illustrates an example of the RTP extension header according to the disclosure. For example, FIG. 7H shows urn:3gpp:pdu-set-IM.

Importance: An 8-bit field indicating the importance of a PDU set to which a payload of a packet including this extension header belongs.

Figure 7I:
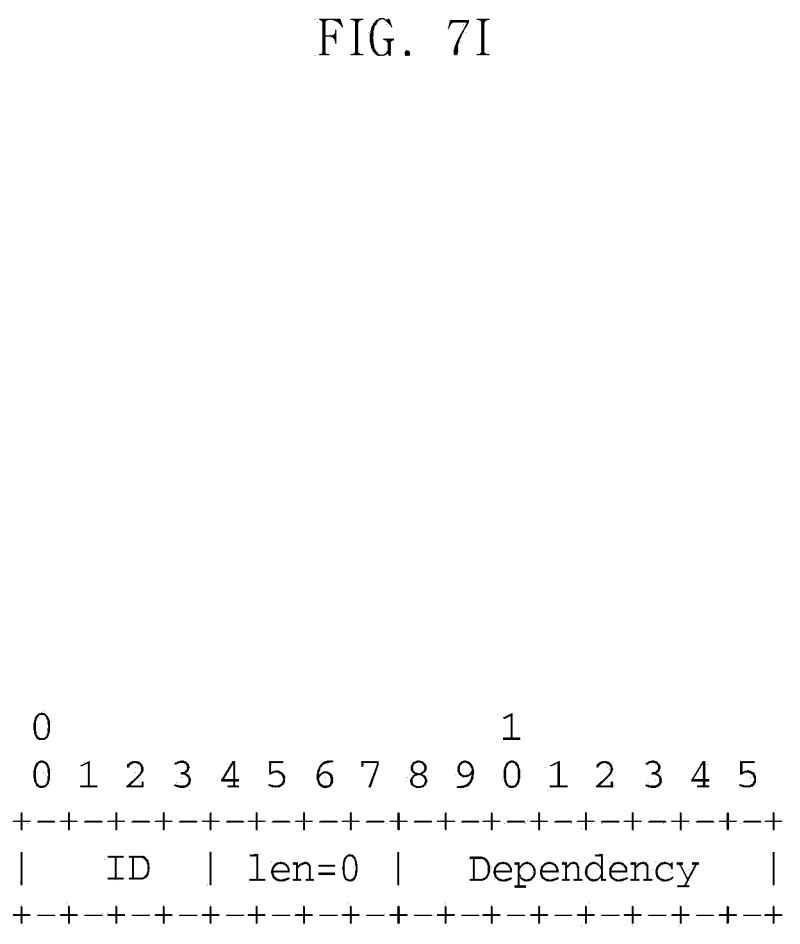

FIG. 7I illustrates an example of the RTP extension header according to the disclosure. For example, FIG. 7I shows urn:3gpp:pdu-set-DEP.

Dependency: An 8-bit field indicating the number of PDU sets depending on a PDU set to which a payload of a packet including this extension header belongs.

Figure 7J:
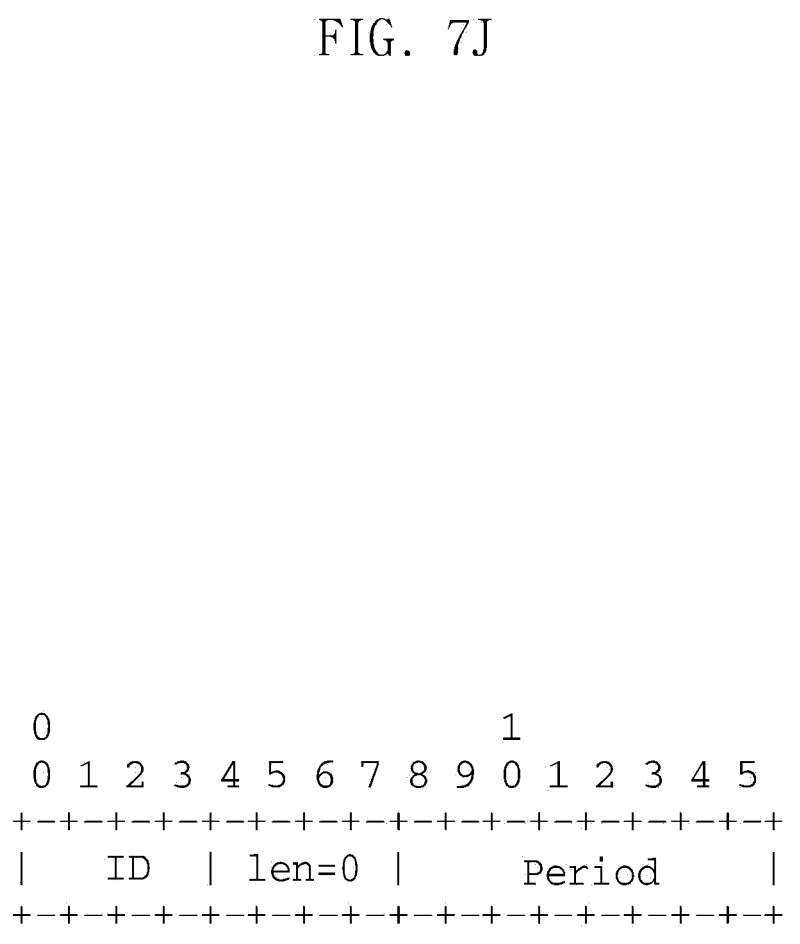

FIG. 7J illustrates an example of the RTP extension header according to the disclosure. For example, FIG. 7J shows urn:3gpp:pdu-set-PE.

Period: An 8-bit field indicating the period of a PDU set to which a payload of a packet including this extension header belongs. This may be expressed by a multiple of a media sampling period (the media sampling period is signaled through an out-band protocol, such as SDP).

Figure 7K:
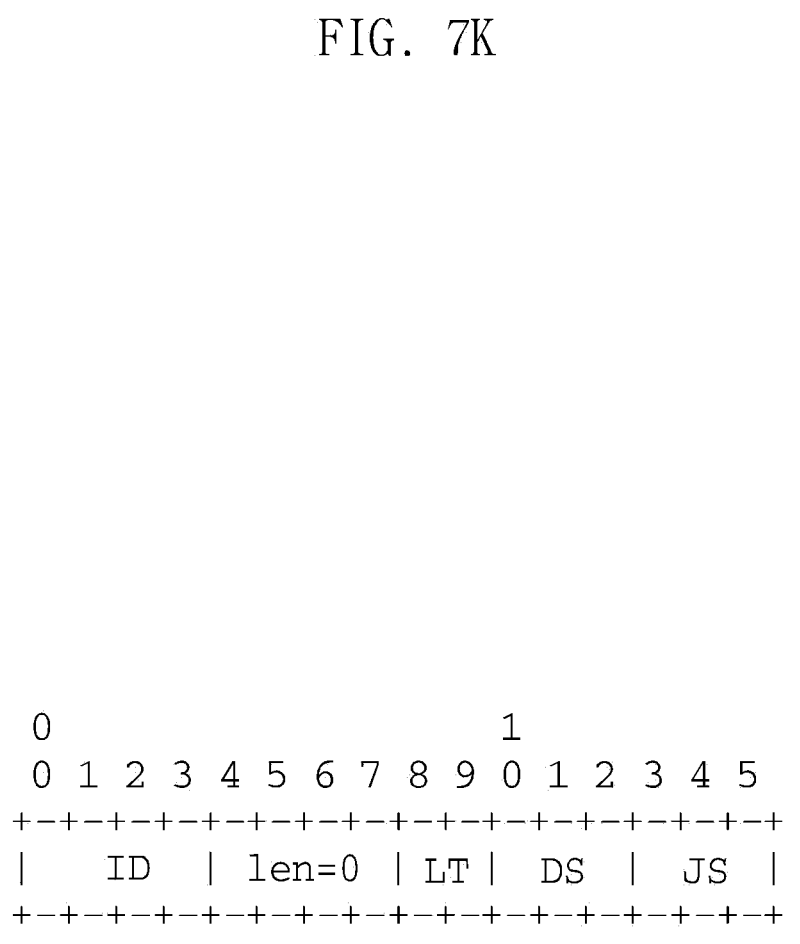

FIG. 7K illustrates an example of the RTP extension header according to the disclosure. For example, FIG. 7K shows urn:3gpp:pdu-set-LDJ.

Loss tolerance (LT): A 2-bit field indicating the loss tolerance of a PDU set to which a payload of a packet including this extension header belongs. In a case where this value is 0, when any one of PDUs belonging to a PDU set is lost, the entire PDU set may be unavailable in an application layer.

Delay sensitivity (DS): A 3-bit field indicating the delay sensitivity of a PDU set to which a payload of a packet including this extension header belongs. The smaller the value is, the more times retransmission may be possible.

Jitter sensitivity (JS): A 3-bit field indicating the jitter sensitivity of a PDU set to which a payload of a packet including this extension header belongs. This is related to packet scheduling of the UPF 103 and the RAN 102.

An RTP session according to an embodiment of the disclosure may transfer PDU set-related information by using a combination of RTP extension headers described above, and a transmission period of a particular RTP extension header and a combination of RTP extension headers included in one RTP packet may vary according to implementation. For example, when payloads of RTP packets including RTP extension headers, each of which provides information in a unit of a PDU set, belong to the same PDU set, the RTP extension headers included in the RTP packets may have the same value. Therefore, an RTP extension header providing information in the unit of a PDU set is included only in one or some more RTP packets in the unit of a PDU set, whereby an overhead for RTP extension header transmission may be reduced. The RTP extension header providing information in the unit of a PDU set may include, among the above RTP extension headers, urn:3gpp: pdu-set-SN, urn:3gpp:pdu-set-BL, urn:3gpp:pdu-set-NP, and urn:3gpp:pdu-set-IM for transferring PDU set identification information, and RTP extension headers for transferring PDU set processing information.

As another example, when only boundary information of a PDU set is to be identified, an RTP packer according to an embodiment of the disclosure may include the urn:3gpp: pdu-set-SN extension header and the urn:3gpp:pdu-set-SE header. When there is a separate method enabling identification of an RTP packet including a payload belonging to one PDU set, the urn:3gpp:pdu-set-SN extension header may be omitted. As an example of the separate method enabling identification of an RTP packet including a payload belonging to one PDU set, RTP packets including RTP packet headers having the same "timestamp" field value may be considered as including payloads belonging to the same PDU set. In addition, only RTP packets including the first PDU and the last PDU of one PDU set may be allowed to include the urn:3gpp:pdu-set-SE extension header, and when the urn:3gpp:pdu-set-SE does not exist, basic values of S and E fields may be considered as 0.

A PDU set marking scheme using an RTP extension header according to an embodiment of the disclosure may be configured by an RTP extension header providing information in a unit of a PDU set and an RTP extension header providing information in a unit of an individual PDU. For example, information in a unit of a PDU set may be provided by including the urn:3gpp:pdu-set extension header, illustrated in FIG. 7L, in at least one RTP packet having, as a payload, a PDU configuring a PDU set.

Figure 7L:
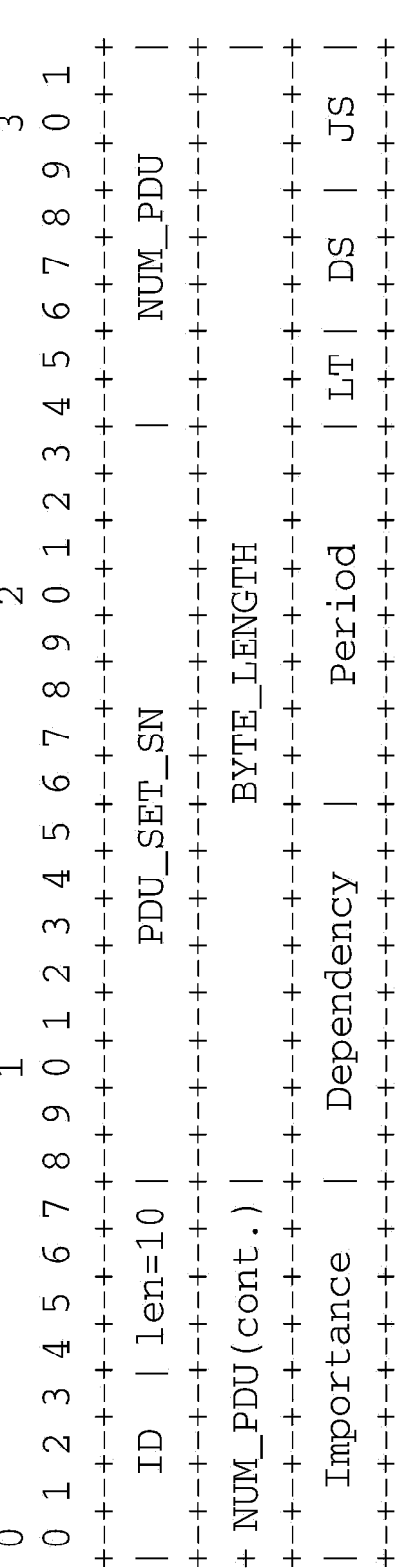
FIG. 7L illustrates an example of the RTP extension header according to the disclosure.

FIG. 7L illustrates an example of the RTP extension header according to the disclosure. For example, FIG. 7L shows urn:3gpp:pdu-set.

In another embodiment of the disclosure, the urn:3gpp: pdu-set may include at least one of a PDU_SET_SN field, a NUM_PDU field, and a BYTE LENGTH field. In the urn:3gpp:pdu-set, an importance field, a dependency field, a period field, a loss tolerance (LT) field, a delay sensitivity (DS) field, and a jitter sensitivity (JS) field indicate PDU set processing information relating to a PDU set to which a payload of an RTP packet including the RTP extension header belongs, and may be selectively present or used according to whether a network and a service are supported.

Figure 7M:
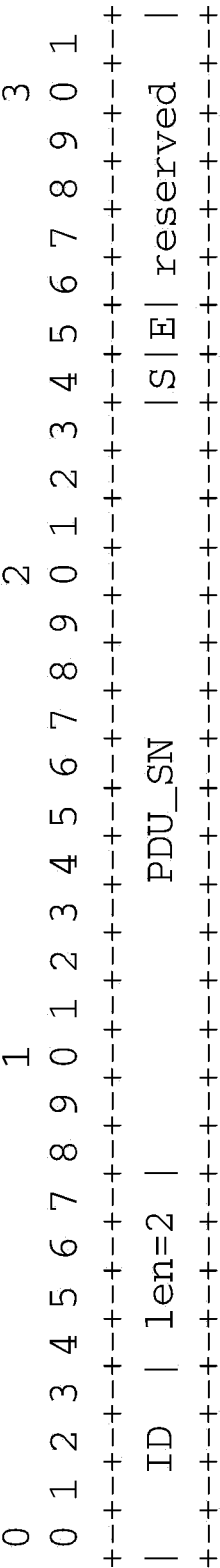
FIG. 7M illustrates an example of the RTP extension header according to the disclosure.
Figure 7N:
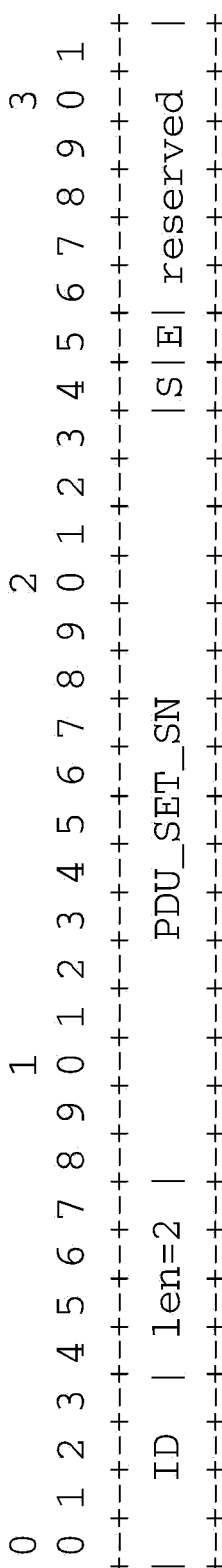
FIG. 7N illustrates an example of the RTP extension header according to the disclosure.
Figure 70:
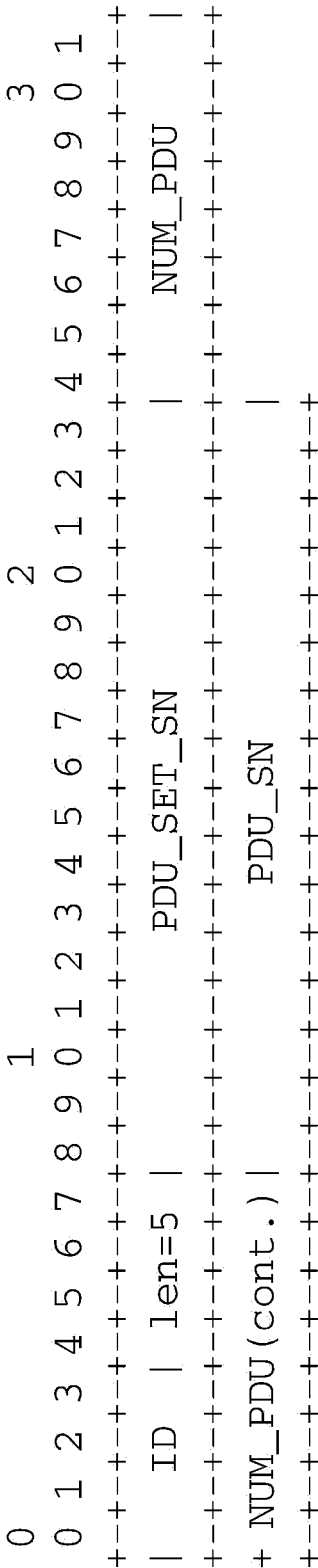

In the embodiment of the disclosure, information in a unit of an individual PDU may be provided by a combination of extension headers according to another embodiment of the disclosure or the following urn:3gpp:pdu, urn:3gpp:pdu2, and urn:3gpp:pdu3 extension headers illustrated in FIGS. 7M, 7N, and 7O.

FIG. 7M illustrates an example of the RTP extension header according to the disclosure. For example, FIG. 7M shows urn:3gpp:pdu.

The urn:3gpp:pdu extension header may be included in the same RTP packet as the urn:3pp: pdu-set extension header.

FIG. 7N illustrates an example of the RTP extension header according to the disclosure. For example, FIG. 7N shows urn:3gpp:pdu2.

FIG. 7O illustrates an example of the RTP extension header according to the disclosure. For example, FIG. 7O shows urn:3gpp:pdu3.

An RTP packet including the urn:3gpp:pdu2 and urn: 3gpp:pdu3 extension headers may not include the urn:3pp: pdu-set extension header. In addition, the urn:3gpp:pdu, urn:3gpp:pdu2, and urn:3gpp:pdu3 extension headers do not provide individual PDU processing information, and when the individual PDU processing information is required, a combination of extension headers according to another embodiment of the disclosure may be used.

In another embodiment of the disclosure, the information in a unit of a PDU set may be provided using at least one of an RTP extension header providing PDU set identification information and an extension header providing PDU set processing information. For example, the PDU set identification information may be transferred using the following urn:3gpp:pdu-set:id extension header illustrated in FIG. 7P.

Figure 7P:
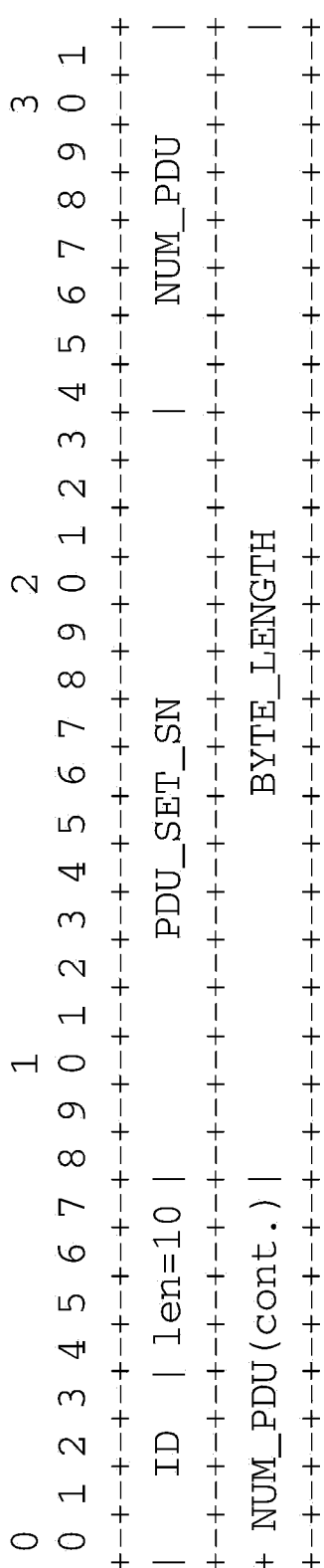
FIG. 7P illustrates an example of the RTP extension header according to the disclosure.
Figure 7Q:
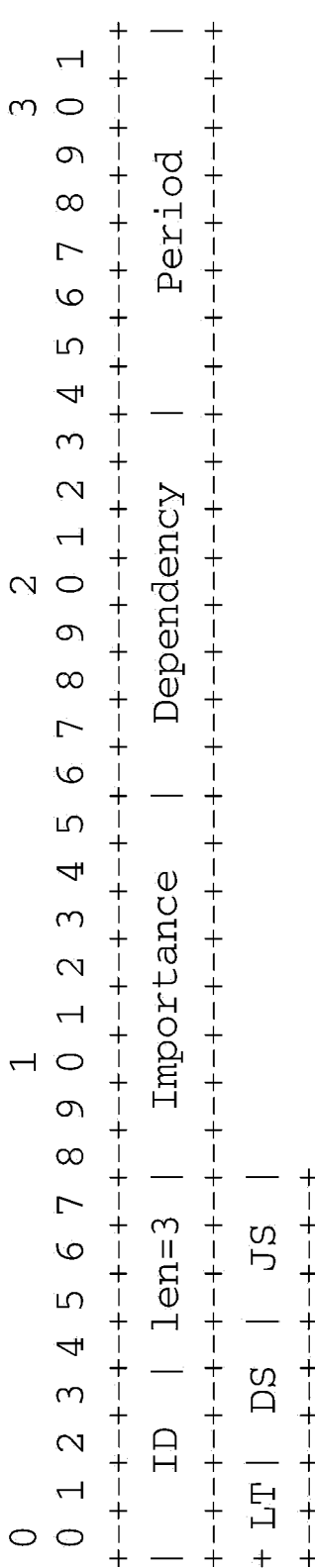
FIG. 7Q illustrates an example of the RTP extension header according to the disclosure.

FIG. 7P illustrates an example of the RTP extension header according to the disclosure. For example, FIG. 7P shows urn:3gpp:pdu-set:id.

In another embodiment of the disclosure, the urn:3gpp: pdu-set:id may include at least one of a PDU_SET_SN field, a NUM_PDU field, and a BYTE LENGTH field. As another example, the PDU set identification information may be transferred using the following urn:3gpp:pdu-set:pack-etHandling extension header illustrated in FIG. 7Q.

FIG. 7Q illustrates an example of the RTP extension header according to the disclosure. For example, FIG. 7Q shows urn:3gpp:pdu-set:packetHandling.

In the urn:3gpp:pdu-set:packetHandling, an importance field, a dependency field, a period field, a loss tolerance (LT) field, a delay sensitivity (DS) field, and a jitter sensitivity (JS) field indicate PDU set processing information relating to a PDU set to which a payload of an RTP packet including the RTP extension header belongs, and may be selectively present or used according to whether a network and a service are supported.

In a PDU set marking scheme using an RTP extension header according to the disclosure, whether to use the RTP extension header and a value of an ID field may be negotiated through out-band signaling, such as SDP. In addition, PDU set processing information described above may be transferred through a media level SDP attribute as follow.

a=PDUSet-info: <period><LT><DS><JS>

For example, PDU set marking to be performed using an RTP extension header described above in a media session transmitted from the media server to the UE 610 is considered. An RTP session included in the media session may be identified using the following parameters.

Transmitter (server) IPv4 address and port number: 111.111.111.111 and 1

Receiver (UE) IPv4 address and port number: 222.222.222.222 and 2

Protocol identifier: RTP/UDP/IP

When urn:3gpp:pdu-set-SN, urn:3gpp:pdu-set-SE, urn: 3gpp:pdu-SN, and urn:3gpp:pdu-set-IM are used among the above RTP extension headers, a value of an ID field of an RTP extension header identified by the urn may be configured as follows.

urn:3gpp:pdu-set-SN: ID=0x1
urn:3gpp:pdu-set-SE: ID=0x2
urn:3gpp:pdu-SN: ID-0x3
urn:3 gpp: pdu-set-IM: ID=0x4

The RTP session parameter and urn and an ID field value of an RTP extension header may be provided to the PCF 113/the NEF 114 by using a detailed parameter of a PDU set marking scheme included in a media session QoS parameter described above, and may be transferred to the UPF 103 through 5G control plane signaling information, so as to be used for identification of a PDU set and determination of a QoS and packet handling scheme to be applied to each PDU set, which are described in process 3 of FIG. 7A above.

For example, PDU set marking having been performed using an RTP extension header described above in a media session transmitted from the media server to the UE 610 is considered. The UPF 103 may first compare an IP of an input packet and information of a UDP packet header with the RTP session parameter to identify a packet belonging to the RTP session. In addition, the UPF 103 may use an ID value of an RTP extension header of the packet belonging to the RTP session, to identify the RTP extension header belonging to the packet and obtain a value thereof. The obtained values of the RTP extension header may be used, as described above, for PDU set identification, recognition of the relation between PDU sets, and determination of a QoS and packet handling scheme to be applied to each PDU set.

The ID field value of the RTP extension header may be determined in an SDP answer/offer process for negotiation of a media transmission parameter between the server 500 and the UE 610. In another embodiment of the disclosure, the ID field value of the RTP extension header may be a value that is determined in advance in a service provisioning process or by an RTC service provider or a network service provider. In addition, in a media session, the ID field value of the RTP extension header may be configured to be the same for all RTP sessions or to be different according to each RTP session.

Figure 8:
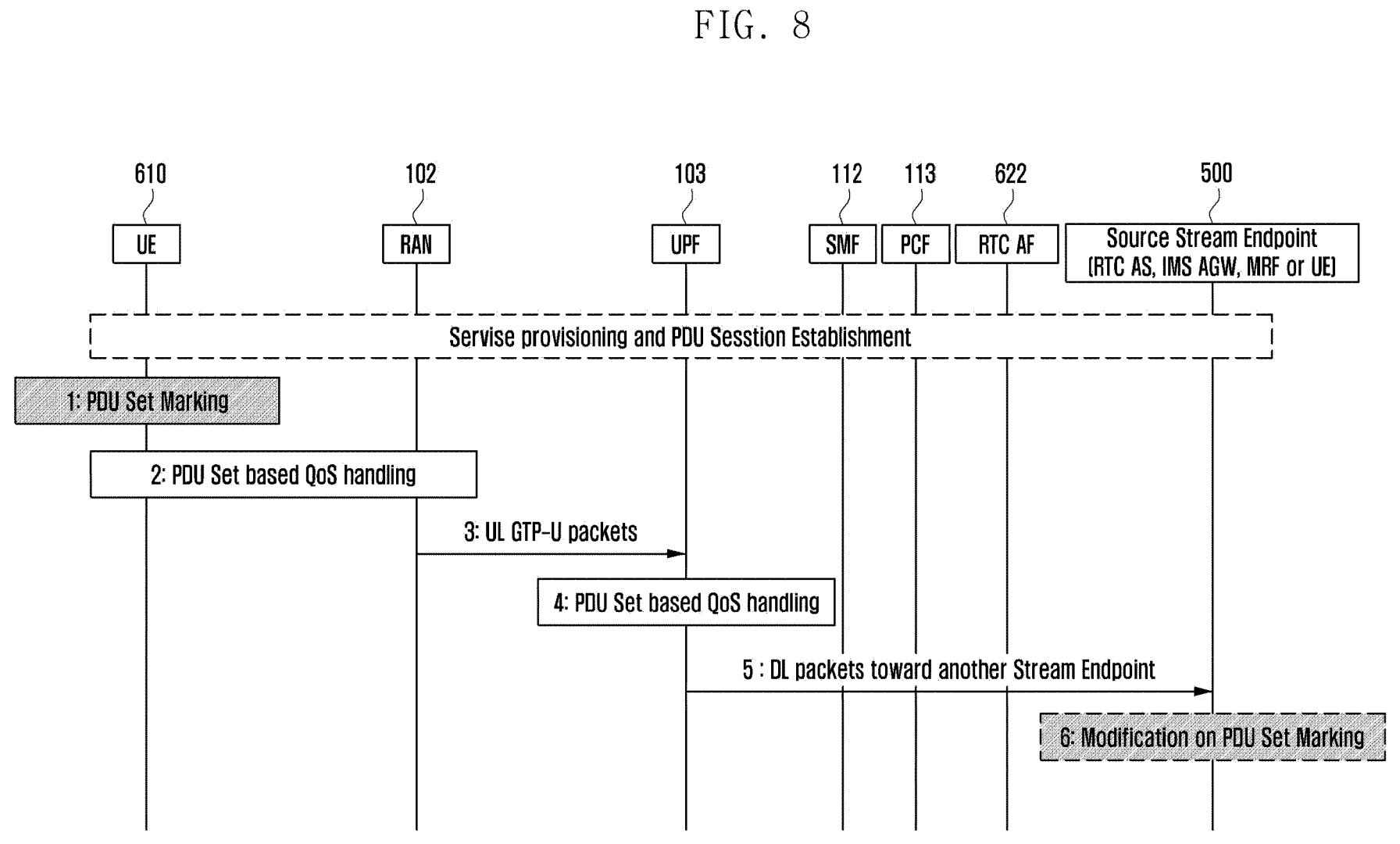

FIG. 8 is a flowchart illustrating a procedure of processing an uplink packet for a real-time communication service in a wireless communication system according to an embodiment of the disclosure.

Referring to FIG. 8, process 1 may be a process of generating, by the UE 610, an uplink packet to which a PDU set marking scheme has been applied. The PDU set marking scheme may be a scheme configured in a service provisioning and media (PDU) session establishment process described above. A detailed parameter may be determined through dynamic negotiation between stream endpoints before transmission of a real media stream. A parameter for the dynamic negotiation may be transferred through a protocol message, such as a session initiation protocol (SIP), a session description protocol (SDP), or the like.

Process 2 is a process of applying, to a packet, a PDU set-based QoS according to PDU set-related information given by the PDU set marking scheme and a policy determined in a media session establishment/modification process, and then transmits the packet to the RAN. For example, the UE 610 may transmit a PDU set processed based on a PDU set-based QoS to the RAN 102. The RAN 102 may receive a PDU set processed based on a PDU set-based QoS from the UE 610.

Process 3 is a process of transferring a packet to the UPF 103 (PSA-UPF) functioning as a PDU session anchor through a GTP tunnel, and the RAN 102 or a middle UPF (not illustrated) may add PDU set-related information to a GTP header so as to allow the middle UPF positioned in a path leading to the PSA-UPF 103 and the PSA-UPF 103 to provide a PDU set-based QoS. For example, the RAN 102 may transmit a UL GTP-U packet to the UPF 103. The UPF 103 may receive a UL GTP-U packet from the RAN 102.

Process 4 is a process in which the PSA-UPF 103 applies a PDU set-based QoS according to PDU set-related information and a policy determined in a media session establishment/modification process.

Process 5 is a process of transmitting an uplink packet to which the QoS has been applied, to the counterpart stream endpoint 500. For example, the UPF 103 may transmit a UL packet to the stream endpoint 500. The stream endpoint 500 may receive a UL packet from the UPF 103.

In process 6, when the stream endpoint 500 is not an endpoint of a media session, the stream endpoint 500 may modify or remove PDU set marking.

For example, a service in which media data having been transmitted by user A is transferred to user C via server B on a network may be considered. For example, a PDU set marking scheme having been applied to an uplink network of user A may be different from a PDU set marking scheme to be applied to a downlink network of user C. In this case, server B may remove or modify the uplink PDU set marking, and a procedure of applying the modified PDU set marking may follow a downlink packet processing procedure described above.

In order to protect media data of a real-time media service, encryption may be applied. In a general SRTP/ DTLS transmission scheme, encryption is applied only to an RTP payload, an RTP header and an extension header are transmitted using a clear text having no encryption applied thereto, and an integrity check function for detecting whether there has been illegal change may be provided. Encryption may be applied to what are related to reliability of a service in an RTP extension header, and to this end, a stream endpoint may function as a DTLS server or a client. The RTC service provider 621 according to the disclosure may identify encrypted PDU set marking, or may allocate a stream endpoint server capable of modifying/removing existing PDU set marking and reflect same on out-band signaling, such as SIP/SDP.

In addition, for support of SRTP/DTLS, the next connection mode may be considered.

UPF/SRTP: The UPF 103 functions as a DTLS server/ client for SRTP support.

Figure 9:
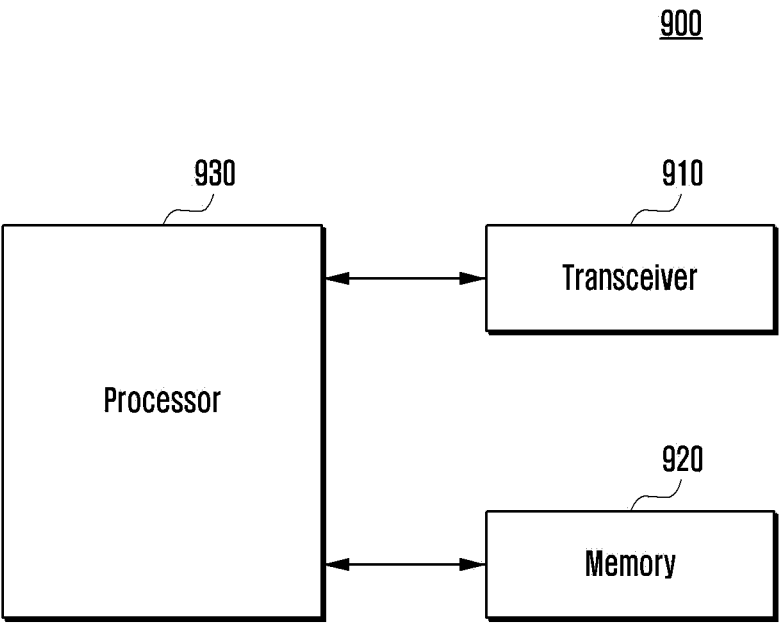
FIG. 9 is a block diagram illustrating a terminal in a wireless communication system according to an embodiment of the disclosure.

FIG. 9 is a block diagram illustrating a terminal in a wireless communication system according to an embodiment of the disclosure.

Referring to FIG. 9, a terminal 900 according to the disclosure may include a transceiver 910, a memory 920, and a processor 930. The terminal 900 may be identical or similar to the terminal 101 in FIG. 1, the terminal 470 in FIG. 4 and FIG. 5, and the UE 610 in FIGS. 6, 7A, and 8.

According to a method of operating the terminal 900, the processor 930, the transceiver 910, and the memory 920 of the terminal 900 may operate. The elements of the terminal 900 are not limited to FIG. 9. For example, the terminal 900 may also include more or fewer elements than the elements of FIG. 9. Moreover, the processor 930, the transceiver 910, and the memory 920 may be implemented into a single chip.

The transceiver 910 is used to collectively indicate a receiver of the terminal 900 and a transmitter of the terminal 900, and may transmit or receive a signal to or from a base station or a network entity. The signal transmitted or received to or from a base station may include control information and data. To this end, the transceiver 910 may include an RF transmitter that up-converts and amplifies a frequency of a transmitted signal, an RF receiver that low-noise amplifies a received signal and down-converts the frequency, and the like. However, the transceiver 910 described above merely corresponds to an embodiment of the disclosure, and the elements of the transceiver 910 are not limited to an RF transmitter and an RF receiver. For example, the transceiver 910 may include a power amplifier 10 according to the disclosure.

In addition, the transceiver 910 may include a wired/wireless transceiver, and may include various elements for transmitting or receiving a signal.

In addition, the transceiver 910 may receive a signal through a wireless channel and output the signal to the processor 930, and may transmit a signal output from the processor 930, through a wireless channel.

In addition, the transceiver 910 may receive a communication signal and output the same signal to the processor, and may transmit a signal output from the processor 930 to a network entity through a wired/wireless network.

The memory 920 may store a program and data required for an operation of the terminal 900. In addition, the memory 920 may store control information or data included in a signal obtained by the terminal 900. The memory 920 may be configured by a storage medium, such as a read only memory (ROM), a random access memory (RAM), a hard disk, a compact disc read only memory (CD-ROM), and a digital versatile disc (DVD), or a combination of storage mediums.

The processor 930 may control a series of processes to enable the terminal 900 to operate according to an embodiment of the disclosure described above. The processor 930 may include at least one processor. For example, the processor 930 may include a communication processor (CP) performing control for communication, and an application processor (AP) controlling a higher layer, such as an application program.

The terminal 900 according to the disclosure may be at least one of various types of communication nodes. For example, the terminal 900 may be at least one of a terminal, a base station, or various types of network entities used in various communication systems.

Figure 10:
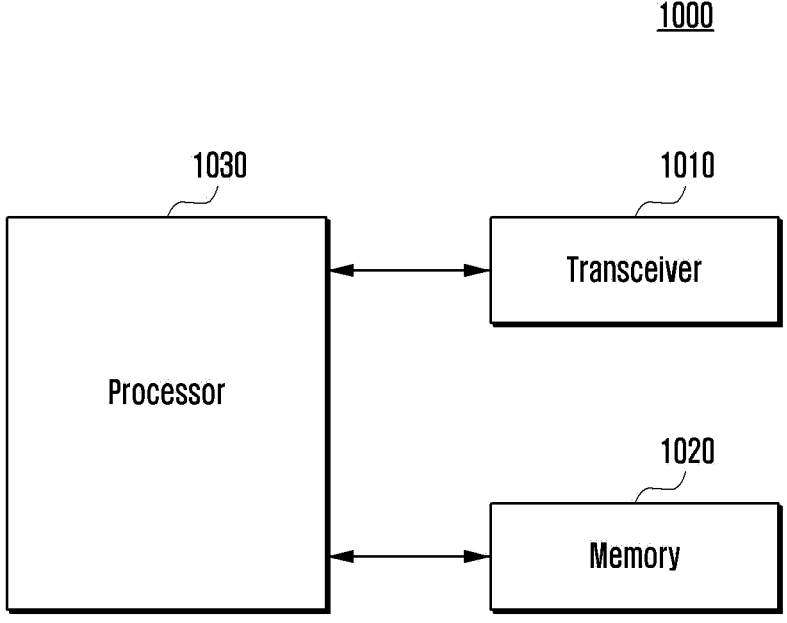
FIG. 10 is a block diagram illustrating a network entity in a wireless communication system according to an embodiment of the disclosure.

FIG. 10 is a block diagram illustrating a network entity in a wireless communication system according to an embodiment of the disclosure.

Referring to FIG. 10, a network entity 1000 may be at least one of the NR-RAN 102, the UPF 103, the AMF 111, the SMF 112, the PCF 113, the NEF 114, the NRF 115, the AUSF 116, the UDM 117, the RTC AS 122, and the RTC (AF).

The network entity 1000 according to the disclosure may include a processor 1030 controlling overall operations of the network entity 1000, a transceiver 1010 including a transmitter and a receiver, and a memory 1020. It is obvious that the disclosure is not limited to the example, and the network entity 1000 may include more or fewer elements than the elements illustrated in FIG. 10.

According to the disclosure, the transceiver 1010 may transmit or receive a signal to or from at least one of other network entities or the terminal 900. The signal transmitted or received to or from at least one of other network entities or the terminal 900 may include control information and data.

According to the disclosure, the processor 1030 may control the network entity 1000 to perform an operation of FIGS. 1 to 8 described above. The processor 1030, the memory 1020, and the transceiver 1010 are not necessarily required to be implemented as separate modules, and may be implemented as one element in the type of a single chip. The processor 1030 and the transceiver 1010 may be electrically connected to each other.

According to the disclosure, the memory 1020 may store data, such as a basic program, an application program, and configuration information for an operation of the network entity 1000. More particularly, the memory 1020 provides stored data according to a request of the processor 1030. The memory 1020 may be configured by a storage medium, such as a ROM, a RAM, a hard disk, a CD-ROM, and a DVD, or a combination of storage mediums. Furthermore, there may be multiple memories 1020. In addition, the processor 1030 may perform the above embodiments of the disclosure, based on a program for performing the above embodiments of the disclosure, the program being stored in the memory 1020.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks, such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of operating a real-time communication application function (RTC AF) entity in a wireless communication system, the method comprising:

receiving, from an RTC service provider, a service provisioning parameter;

generating a parameter for AF session with quality of service (QoS), based on the service provisioning parameter; and transmitting, to a policy control function (PCF), the media session-parameter for AF session with QoS including information on a protocol for packet data unit (PDU) set marking and a QoS parameter for a PDU set, wherein the information on the protocol for PDU set marking includes information on a uniform resource identifier (URI) of a real-time transport protocol (RTP) header extension for the PDU set marking and a local identifier mapped to the URI in a multimedia session level or an RTP session level.

2. The method of claim 1, wherein the service provisioning parameter includes information on a type and a configuration for a serviceable media codec related to at least one of advanced video coding-high definition (AVC-HD), advanced video coding-full high definition (AVC-FullHD), advanced video coding-ultra high definition (AVC-UHD), high efficiency video coding-high definition (HEVC-HD), high efficiency video coding-full high definition (HEVC-FullHD), high efficiency video coding-ultra high definition (HEVC-UHD), enhanced voice services (EVS), or enhanced advanced audio coding plus (eAAC+).

3. The method of claim 1, wherein the service provisioning parameter includes a media transmission protocol, and wherein the media transmission protocol includes at least one of:

RTP/user datagram protocol (UDP)/internet protocol (IP);

secure real-time transport protocol (SRTP)/datagram transport layer security (DTLS)/UDP/IP;

hypertext transfer protocol (HTTP) 1.x/transmission control protocol (TCP)/IP;

HTTP3/quick UDP internet connections (QUIC)/UDP; or

RTP/QUIC/UDP.

4. The method of claim 1, wherein the service provisioning parameter includes the information on the protocol for PDU set marking, and wherein the information on the protocol for PDU set marking further includes at least one of a header extension uniform resource locator (URL) or a connection mode.

5. The method of claim 1, wherein the service provisioning parameter includes the QoS parameter for the PDU set, and wherein the QoS parameter for the PDU set includes at least one of a PDU set delay budget (PSDB), a PDU set error rate (PSER), a loss tolerance, a PDU set maximum size, a PDU set period, an end-to-end (EtoE) delay, a bandwidth, or a delay/jitter sensitivity.

6. The method of claim 1, wherein the parameter for AF session with QoS further includes media session identification information, and wherein the media session identification information includes at least one of a transmission/reception internet protocol (IP) address, a port number, or a protocol identifier.

7. The method of claim 1, wherein the parameter for AF session with QoS further includes media identification information, and wherein the media identification information comprises a multipurpose internet mail extensions (MIME) type text string.

8. The method of claim 1, further comprising:

generating a stream endpoint (SEP) configuration parameter, based on the service provisioning parameter; and transmitting, to an SEP entity, the SEP configuration parameter, wherein the stream endpoint configuration parameter includes information on a type and a configuration for a serviceable media codec related to at least one of advanced video coding-high definition (AVC-HD), advanced video coding-full high definition (AVC-FullHD), advanced video coding-ultra high definition (AVC-UHD), high efficiency video coding-high definition (HEVC-HD), high efficiency video coding-full high definition (HEVC-FullHD), high efficiency video coding-ultra high definition (HEVC-UHD), enhanced voice services (EVS), or enhanced advanced audio coding plus (eAAC+).

9. The method of claim 8, wherein the SEP configuration parameter further includes a media transmission protocol, and wherein the media transmission protocol comprises at least one of:

RTP/user datagram protocol (UDP)/Internet protocol (IP);

secure real-time transport protocol (SRTP)/datagram transport layer security (DTLS) UDP/IP;

hypertext transfer protocol (HTTP) 1.x/transmission control protocol (TCP)/IP;

HTTP3/quick UDP internet connections (QUIC)/UDP; or

RTP/QUIC/UDP.

10. The method of claim 8, wherein the SEP configuration parameter further includes the information on the protocol for PDU set marking, wherein the information on the protocol for PDU set marking further includes at least one of a header extension uniform resource locator (URL) or a connection mode.

11. The method of claim 8, wherein the SEP configuration parameter further includes the QoS parameter for the PDU set, and wherein the QoS parameter for the PDU set further includes at least one of a PDU set delay budget (PSDB), a PDU set error rate (PSER), a loss tolerance, a PDU set maximum size, a PDU set period, an end-to-end (EtoE) delay, a bandwidth, or a delay/jitter sensitivity.

12. A method of operating a user plane function (UPF) in a wireless communication system, the method comprising:

receiving, from a stream endpoint (SEP) entity, a downlink packet including packet data unit (PDU) set marking information;

identifying a PDU set, based on the PDU set marking information; and transmitting, to a base station, a downlink general packet radio service (GPRS) tunneling protocol (GTP)-user plane (U) packet, based on the identified PDU set.

13. The method of claim 12, wherein the PDU set marking information includes at least one of PDU set identification information or PDU set processing information.

14. The method of claim 13, wherein the PDU set identification information includes at least one of a PDU set sequence number, a start/end PDU of the PDU set, a PDU sequence number (SN) within the PDU set, or the number of PDUs within the PDU set.

15. The method of claim 13, wherein the PDU set processing information includes at least one of a PDU set importance, a PDU set dependency, a PDU set period, a PDU set loss tolerance, or a PDU set delay/jitter sensitivity.

16. A method of operating a user plane function (UPF) in a wireless communication system, the method comprising:

receiving, from a base station, an uplink general packet radio service (GPRS) tunneling protocol (GTP)-user plane (U) packet including packet data unit (PDU) set marking information generated by a terminal;

configuring a quality of service (QoS), based on the PDU set marking information; and transmitting, to a stream endpoint (SEP) entity, an uplink packet including the PDU set marking information, based on the configured QoS.

17. The method of claim 16, wherein, in case that the SEP entity is not an endpoint entity of a media session, the PDU set marking information is modified or removed by the stream endpoint entity.

18. The method of claim 17, wherein the PDU set marking information includes at least one of PDU set identification information or PDU set processing information, wherein the PDU set identification information includes at least one of a PDU set sequence number, a start/end PDU of a PDU set, a PDU sequence number (SN) within the PDU set, or the number of PDUs within the PDU set, and wherein the PDU set processing information includes at least one of a PDU set importance, a PDU set dependency, a PDU set period, a PDU set loss tolerance, or a PDU set delay/jitter sensitivity.

19. A real-time communication application function (RTC AF) entity in a wireless communication system, the RTC AF entity comprising:

a transceiver; and a processor coupled to the transceiver and configured to:

receive, from an RTC service provider, a service provisioning parameter, generate a parameter for AF session with quality of service (QoS), based on the service provisioning parameter, and transmit, to a policy control function (PCF), the parameter for AF session with QoS including information on a protocol for packet data unit (PDU) set marking and a QoS parameter for a PDU set, wherein the information on the protocol for PDU set marking includes information on a uniform resource identifier (URI) of a real-time transport protocol (RTP) header extension for the PDU set marking and a local identifier mapped to the URI in a multimedia session level or an RTP session level.

* * * * *